United States Patent
Devarajan et al.

(10) Patent No.: US 10,594,656 B2
(45) Date of Patent: Mar. 17, 2020

(54) MULTI-TENANT CLOUD-BASED FIREWALL SYSTEMS AND METHODS

(71) Applicants: Srikanth Devarajan, San Jose, CA (US); Vladimir Stepanenko, Sunnyvale, CA (US); Ravinder Verma, San Jose, CA (US); James Kawamoto, San Jose, CA (US)

(72) Inventors: Srikanth Devarajan, San Jose, CA (US); Vladimir Stepanenko, Sunnyvale, CA (US); Ravinder Verma, San Jose, CA (US); James Kawamoto, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 119 days.

(21) Appl. No.: 14/943,579

(22) Filed: Nov. 17, 2015

(65) Prior Publication Data

US 2017/0142068 A1   May 18, 2017

(51) Int. Cl.
*H04L 29/06* (2006.01)
*H04L 29/08* (2006.01)
*H04L 12/26* (2006.01)

(52) U.S. Cl.
CPC ........ *H04L 63/0254* (2013.01); *H04L 43/028* (2013.01); *H04L 63/0218* (2013.01); *H04L 67/10* (2013.01); *H04L 67/141* (2013.01); *H04L 67/146* (2013.01)

(58) Field of Classification Search
None
See application file for complete search history.

(56) References Cited

U.S. PATENT DOCUMENTS

| | | | | |
|---|---|---|---|---|
| 7,131,141 B1* | 10/2006 | Blewett | ............... | H04L 63/0209 713/153 |
| 8,259,571 B1* | 9/2012 | Raphel | ............... | H04L 61/2535 370/230 |
| 8,276,202 B1* | 9/2012 | Dubrovsky | ......... | H04L 63/0245 726/22 |
| 8,869,259 B1* | 10/2014 | Udupa | ............... | H04L 63/0823 726/10 |
| 8,887,236 B2 | 11/2014 | Allison et al. | | |
| 9,419,942 B1* | 8/2016 | Buruganahalli | .... | H04L 63/0227 |
| 2006/0174336 A1 | 8/2006 | Chen | | |

(Continued)

OTHER PUBLICATIONS

Dec. 20, 2016 European Search Report issued in European Patent Application EP 16 16 8949.

*Primary Examiner* — Kambiz Zand
*Assistant Examiner* — Arezoo Sherkat
(74) *Attorney, Agent, or Firm* — Clements Bernard Walker; Lawrence A. Baratta, Jr.

(57) ABSTRACT

A multi-tenant cloud-based firewall method from a client, performed by a cloud node, includes receiving a packet from the client, wherein the client is located externally from the cloud node; checking if a firewall session exists for the packet, and if so, processing the packet on a fast path where a lookup is performed to find the firewall session; if no firewall session exists, creating the firewall session; and processing the packet according to the firewall session and one or more rules. The cloud node can perform the method without a corresponding appliance or hardware on premises, at a location associated with the client, for providing a firewall.

18 Claims, 25 Drawing Sheets

(56) References Cited

U.S. PATENT DOCUMENTS

| | | | |
|---|---|---|---|
| 2010/0043068 A1* | 2/2010 | Varadhan | H04L 12/4633 726/15 |
| 2012/0210417 A1* | 8/2012 | Shieh | H04L 63/0218 726/12 |
| 2012/0300615 A1* | 11/2012 | Kempf | H04W 24/02 370/216 |
| 2012/0304244 A1* | 11/2012 | Xie | G06F 21/00 726/1 |
| 2014/0007222 A1* | 1/2014 | Qureshi | G06F 21/10 726/16 |
| 2014/0115578 A1* | 4/2014 | Cooper | G06F 21/606 718/1 |
| 2014/0208426 A1* | 7/2014 | Natarajan | H04L 63/1416 726/23 |
| 2014/0259094 A1* | 9/2014 | Narayanaswamy | H04L 67/20 726/1 |
| 2015/0058967 A1* | 2/2015 | Ringdahl | H04L 63/0254 726/11 |
| 2015/0106909 A1 | 4/2015 | Chen et al. | |
| 2015/0143501 A1* | 5/2015 | Cherukuri | H04L 63/02 726/11 |
| 2015/0244617 A1* | 8/2015 | Nakil | G06F 9/45558 709/224 |
| 2016/0080395 A1* | 3/2016 | Reddy | H04L 63/1425 726/23 |
| 2016/0205071 A1* | 7/2016 | Cooper | H04L 12/6418 726/1 |
| 2016/0226825 A1* | 8/2016 | Ardeli | H04L 63/0227 |

* cited by examiner

Network Services

| # | Name | TCP Source Ports | TCP Destination Ports | UDP Source Ports | UDP Destination Ports | Description |
|---|---|---|---|---|---|---|
| 1 | AIM | -- | 5190 | -- | -- | AIM (originally AOL Instant Messe... |
| 2 | DNS | -- | 53 | -- | 53 | The DNS protocol is used to transl... |
| 3 | Echo | -- | 7 | -- | 7 | Echo Protocol is a service in the In... |
| 4 | FTP | -- | 21 | -- | -- | The FTP protocol is used for reliab... |
| 5 | Gnutella | -- | 6346-6347 | -- | 6346-6347 | Gnutella is a peer-to-peer protocol |
| 6 | H.323 | -- | 1503, 1720, 1731, 389, 522 | -- | 1719 | H.323 is a standard approved by I... |
| 7 | HTTP | -- | 80, 81, 82 | -- | -- | The Hypertext Transfer Protocol i... |
| 8 | HTTP Proxy | -- | 3128, 8080 | -- | -- | HTTP tunneling is a technique by ... |
| 9 | HTTPS | -- | 443 | -- | -- | HTTPS is the secure version of HT... |
| 10 | ICMP | -- | -- | -- | -- | ICMP is one of the main protocols... |
| 11 | Ident | -- | 113 | -- | -- | The Identification Protocol provid... |
| 12 | IKE | -- | 500 | -- | 500 | IKE is a protocol to obtain authent... |
| 13 | IKE-NAT | -- | -- | -- | 4500 | IKE-NAT allows Network Address ... |
| 14 | ILS | -- | 1002, 389, 522, 636 | -- | -- | Internet Locator Service includes ... |
| 15 | IMAP | -- | 143, 220, 993 | -- | 220 | Internet Message Access Protocol ... |
| 16 | IRC | -- | 6660-6669 | -- | -- | IRC (Internet Relay Chat) is an inst... |
| 17 | Kerberos | -- | 88 | -- | 88 | Kerberos is a computer network a... |

FIG. 9

| # | Name | Category | Description |
|---|---|---|---|
| 22 | aielgame | Web | aielgame: This protocol plug-in classifies the http traffic to the host aielgame.com. |
| 23 | aili | Web | aili: Chinese fashion shopping website. |
| 24 | aim | Instant Messaging | aim: AIM (originally AOL Instant Messenger) is an instant messaging application. The protocol name is OSCAR (Open System for Communi-cati... |
| 25 | aim_express | Instant Messaging | aim_express: AOL Instant Messaging Express supports many of the standard features included in AIM, but does not provide advanced feature... |
| 26 | aim_transfer | File_server_transfer | aim_transfer: AIM is an instant messaging protocol. |
| 27 | aimini | File_server_transfer | aimini: Aimini is an online solution to store, send and share files |
| 28 | aims | Instant Messaging | aims: AIMS is the secure version of AIM |
| 29 | airaim | Instant Messaging | airaim: This protocol plug-in classifies the http traffic to the host airaim.com. It also classifies the ssl traffic to the Common Name airaim.com |
| 30 | aizhan | Web | aizhan: This protocol plug-in classifies the http traffic to the host aizhan.com. |
| 31 | akamai | Web | akamai: This protocol plug-in classifies the http traffic to the hosts ekamai.net, akamaihd.net, akamaiedge.net, edgesuite.net, edgekey.net an... |
| 32 | Alexa | Web | alexa: This protocol plug-in classifies the http traffic to the host alexa.com. |
| 33 | Alibaba | Web | alibaba: Alibaba is the world largest online business-to-business trading platform for small businesses. |
| 34 | alimama | Web | alimama: This protocol plug-in classifies the http traffic to the host alimama.com |
| 35 | alipay | Web | alipay: This protocol plug-in classifies the http traffic to the host alipay.com. It also classifies the ssl traffic to the Common Name alipay.com |
| 36 | aljazeera | Web | aljazeera: This protocol plug-in classifies the http traffic to the host aljazeera.net. |
| 37 | All other Store | Mobile App Download | unknown_store: SMURL_MAPPSTORE_UNKNOWN_STORE |
| 38 | all_slots_casino | Online gaming | all_slots_casino: This protocol plug-in classifies the http traffic to the host setup.realgaming.com |
| 39 | allocine | Web | allocine: This protocol plug-in classifies the http traffic to the host allocine.fr |
| 40 | altiris | network_management | altiris: Altiris provides service-oriented management solutions which allow managing IT infrastructures |
| 41 | Amazon App Store | Mobile App Download | amazon_store: SMURL_MAPPSTORE_AMAZON_STORE |

FIG. 10

Add Firewall Filtering Rule

Firewall Filtering Rule

- Rule Order: 12
- Admin Rank: 7
- Rule Name: Firewall_1
- Rule Status: Enabled

Who, Where, & When | Services & Applications | Source IPs | Destination IPs

Criteria

- Users: Any
- Groups: Any
- Departments: Any
- Locations: Any
- Time: Always

Action

- Network Traffic: Allow
- Logging: Full

| Rule Order | Rule Name | Criteria | Action |
|---|---|---|---|
| 1 | Skype | Network Applications: Skype | Allow |
| 2 | Bittorrent | Network Applications: BitTorrent | Block/Drop |
| 3 | ICMP | Network Services: ICMP | Allow |
| 4 | Alexa, Alibaba | Network Applications: Alexa, Alibaba | Block/Drop |
| 5 | Basic | Network Services: DNS, HTTP, HTTPS | Allow |
| Default | Default Firewall Filtering Rule | Any | Block/Drop |

Advanced Settings

Authentication Bypass

Bypassed URL Categories: None

Bypassed URLs: Use Enter to add multipl

Internal IP Logging

Log Internal IPs from XFF Headers: ✗

Windows App Traffic Authentication

Enforce Surrogate IP Authentication: ✓

HTTP Tunnel Control

Inspect tunneled HTTP traffic: ✗

Block tunneling to non-HTTP/HTTPS ports: ✗

Services Forwarded to HTTP Web Proxy

HTTP Services: HTTP

HTTPS Services: HTTPS

Services Applicable to DNS Transaction Policies

DNS Services: DNS

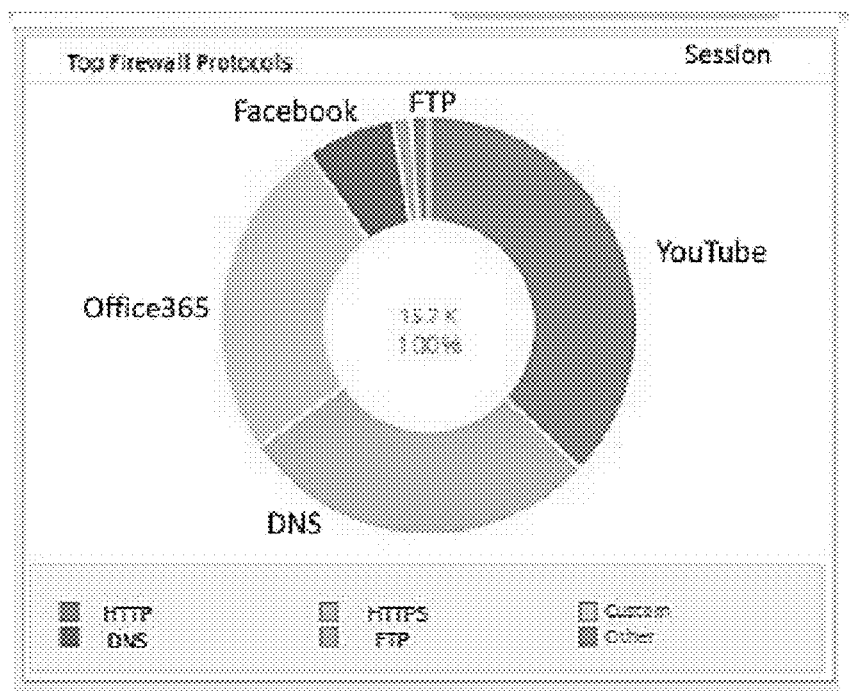
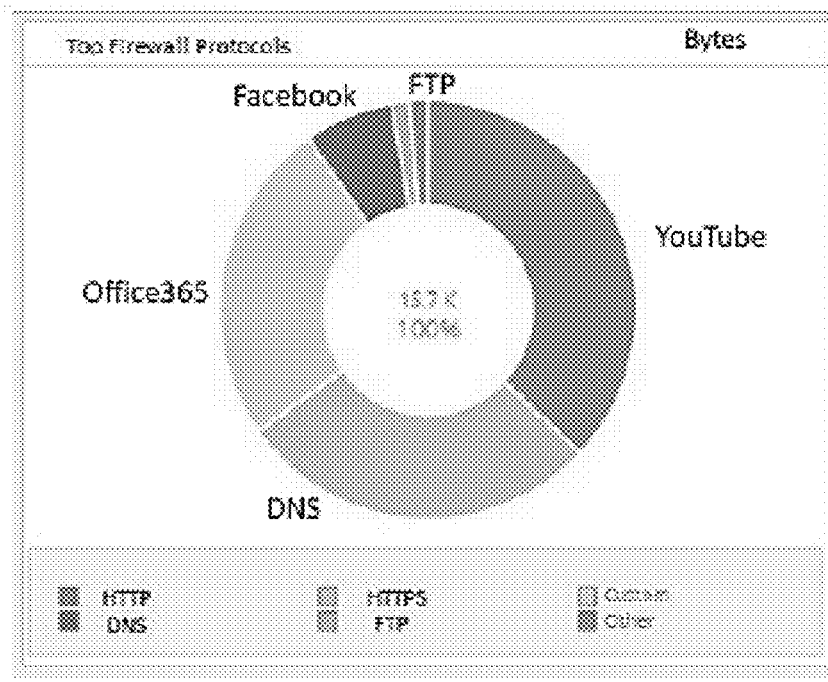
FIG. 25

MULTI-TENANT CLOUD-BASED FIREWALL SYSTEMS AND METHODS

FIELD OF THE DISCLOSURE

The present disclosure generally relates to computer networking systems and methods. More particularly, the present disclosure relates to multi-tenant cloud-based firewall systems and methods.

BACKGROUND OF THE DISCLOSURE

In networks, firewalls monitor and control incoming and outgoing network traffic based on predetermined security rules. A firewall typically establishes a barrier between a trusted, secure internal network and another outside network, such as the Internet, that is assumed not to be secure or trusted. Firewalls are often categorized as either network firewalls or host-based firewalls. Network firewalls are a software appliance running on general purpose hardware or hardware-based firewall computer appliances that filter traffic between two or more networks. Host-based firewalls provide a layer of software on one host that controls network traffic in and out of that single machine. Firewall appliances may also offer other functionality to the internal network they protect such as acting as a Dynamic Host Configuration Protocol (DHCP) or Virtual Private Network (VPN) server for that network. Disadvantageously, conventional firewalls, either network firewalls or host-based firewalls are physical devices located at the boundary between the internal network and the outside network (the Internet). That is, network firewalls are appliance-based at the network boundary, and host-based firewalls are on a single device. This scheme does not reflect the evolving network of cloud-based connectivity, Bring Your Own Device (BYOD), etc. For example, a road warrior, home user, or employee with their mobile device does not have the benefit of a network firewall outside of the internal network. Also, mobile devices and their associated operating systems may not allow host-based firewalls.

Thus, there is a need for next-generation firewall systems and methods that can adapt to the evolving network.

BRIEF SUMMARY OF THE DISCLOSURE

In an exemplary embodiment, a multi-tenant cloud-based firewall method from a client, performed by a cloud node, includes receiving a packet from the client, wherein the client is located externally from the cloud node; checking if a firewall session exists for the packet, and if so, processing the packet on a fast path where a lookup is performed to find the firewall session; if no firewall session exists, creating the firewall session; and processing the packet according to the firewall session and one or more rules. The cloud node can perform the method without a corresponding appliance or hardware on premises, at a location associated with the client, for providing a firewall. The client can be from one of a plurality of customers, each customer having its own rules for any of users, locations, departments, and groups. The cloud node can be part of a distributed security system and the method can further include processing the packet for a plurality of malware, spyware, viruses, email spam, Data Leakage Prevention, and content filtering. The client can be connected to the cloud node via one of Generic Routing Encapsulation (GRE) and an Internet Protocol (IP) security (IPsec) tunnel, regardless of location and device type of the client. The method can further include determining an application associated with the packet and subsequent packets in the firewall session utilizing Deep Packet Inspection (DPI). The DPI can include one or more of explicit classification, use of protocol data signatures, classification based on port, classification based on Internet Protocol (IP), pattern matching, and session correlation. The one or more rules operate over all ports and protocols. The one or more rules can include user-based rules based on identifying the client based on surrogation.

In another exemplary embodiment, a multi-tenant cloud-based firewall method from a server, performed by a cloud node, includes receiving a packet from the server, wherein the server is located externally from the cloud node; checking if a firewall session exists for the packet, and if so, processing the packet on a fast path where a lookup is performed to find the firewall session; if no firewall session exists, creating the firewall session; and processing the packet according to the firewall session and one or more rules. The cloud node performs the method without a corresponding appliance or hardware on premises, at a location associated with the server, for providing a firewall. The server communicates with a client from one of a plurality of customers, each customer having its own rules for any of users, locations, departments, and groups. The cloud node is part of a distributed security system, and the method further includes processing the packet for a plurality of malware, spyware, viruses, email spam, Data Leakage Prevention, and content filtering. The client can be connected to the cloud node via one of Generic Routing Encapsulation (GRE) and an Internet Protocol (IP) security (IPsec) tunnel, regardless of location and device type of the client. The method can further include determining an application associated with the packet and subsequent packets in the firewall session utilizing Deep Packet Inspection (DPI). The DPI can include one or more of explicit classification, use of protocol data signatures, classification based on port, classification based on Internet Protocol (IP), pattern matching, and session correlation. The one or more rules operate over all ports and protocols. The one or more rules can include user-based rules based on identifying the client based on surrogation.

In a further exemplary embodiment, a node in a cloud-based security system configured to provide a multi-tenant cloud-based firewall includes a network interface, a data store, and a processor communicatively coupled to one another; and memory storing computer executable instructions, and in response to execution by the processor, the computer-executable instructions cause the processor to perform steps of receive a packet from the a device, wherein the device is located externally from the cloud node; check if a firewall session exists for the packet, and if so, process the packet on a fast path where a lookup is performed to find the firewall session; if no firewall session exists, create the firewall session; and process the packet according to the firewall session and one or more rules.

BRIEF DESCRIPTION OF THE DRAWINGS

The present disclosure is illustrated and described herein with reference to the various drawings, in which like reference numbers are used to denote like system components/method steps, as appropriate, and in which:

FIG. 9 is a screen shot associated with the firewall illustrating exemplary network services;

FIG. 10 is a screen shot associated with the firewall illustrates exemplary applications;

FIG. 12A is a screen shot of defining a firewall filtering rule;

FIG. 13 is screen shots of editing IP groups;

FIG. 18 is a screen shot of creating firewall policies;

FIG. 19 is a screen shot of a NAT configuration;

FIG. 20 is a screen shot of a user authentication screen;

FIG. 21 is a screen shot of DNS policy;

FIG. 25 is graphs of top firewall protocols in sessions and bytes.

DETAILED DESCRIPTION OF THE DISCLOSURE

In various exemplary embodiments, multi-tenant cloud-based firewall systems and methods are described. The firewall systems and methods can operate overlaid with existing branch office firewalls or routers as well as eliminate the need for physical firewalls. The firewall systems and methods can protect users at user level control, regardless of location, device, etc., over all ports and protocols (not only ports 80/443) while providing administrators a single unified policy for Internet access and integrated reporting and visibility. In an exemplary embodiment, the firewall systems and methods can eliminate dedicated hardware at user locations (e.g., branch or regional offices, etc.), providing a software-based cloud solution, such as a Virtualized Network Function (VNF) in the cloud. The firewall systems and methods support application awareness to identify application regardless of port, protocol, evasive tactic, or Secure Sockets Layer (SSL); user awareness to identify users, groups, and locations regardless of physical Internet Protocol (IP) address; visibility and policy management providing globally unified administration, policy management, and reporting; threat protection and compliance to block threats and data leaks in real-time; high performance through an in-line cloud-based, scalable system; and cost effectiveness with rapid deployment. In an exemplary embodiment, the firewall systems and methods are described implemented through or in conjunction with a distributed, cloud-based security system and the firewall systems and methods can be integrated with sandboxing, web security, Data Leakage Prevention (DLP), content filtering, SSL inspection, malware protection and cloud-scale correlation, anti-virus, bandwidth management reporting and analytics, and the like.

§ 1.0 Example High-Level System Architecture—Cloud-Based Security System

Figure 1:
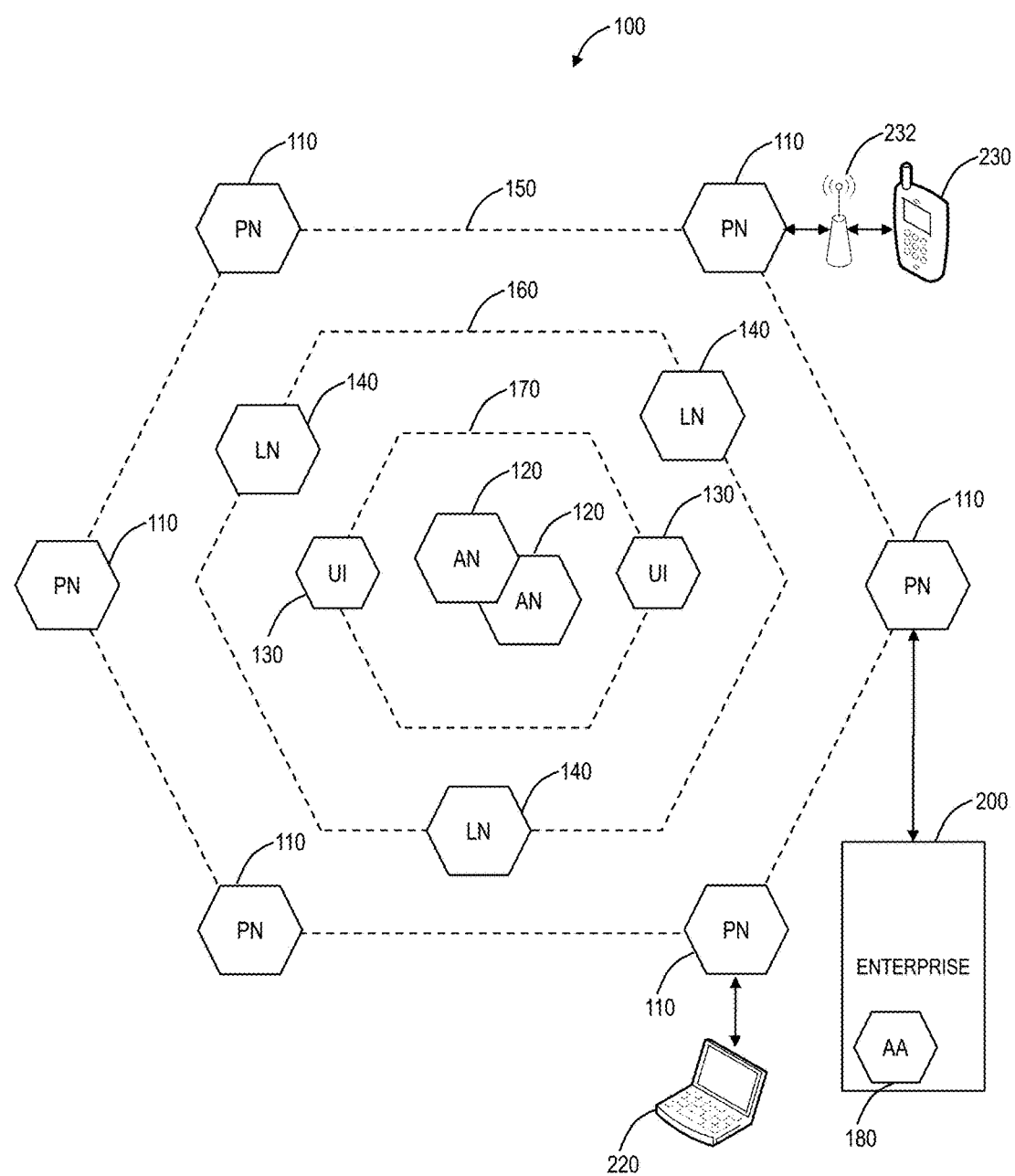
FIG. 1 is a network diagram of a distributed security system.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, DLP, content filtering, etc., and other undesirable content sent from or requested by an external system. The processing nodes 110 can also log activity and enforce policies, including logging changes to the various components and settings in the system 100. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part $C=[c1, c2, \ldots, cm]$ of the content item, at any of the processing nodes 110, any one of the data inspection engines generates an output that results in a classification of "violating."

Figure 3:
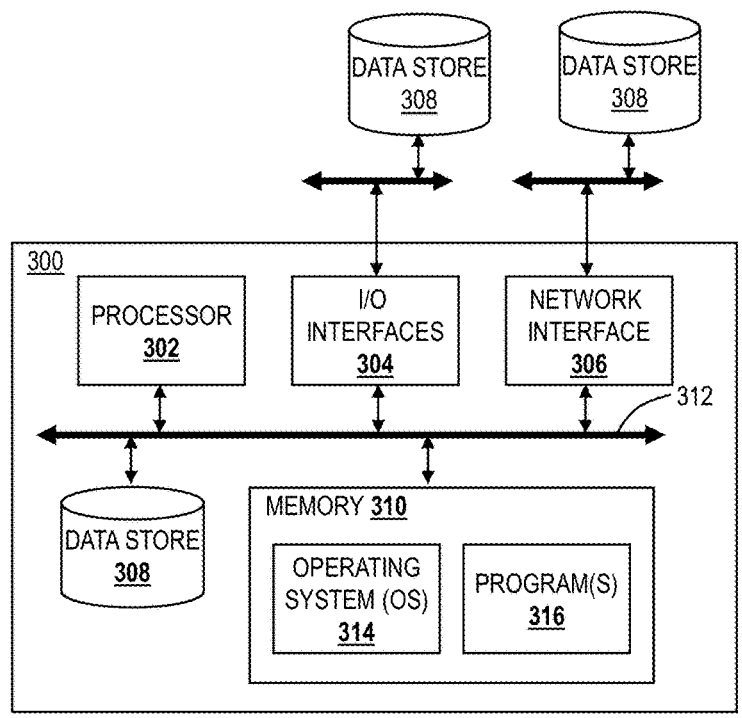
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 170. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
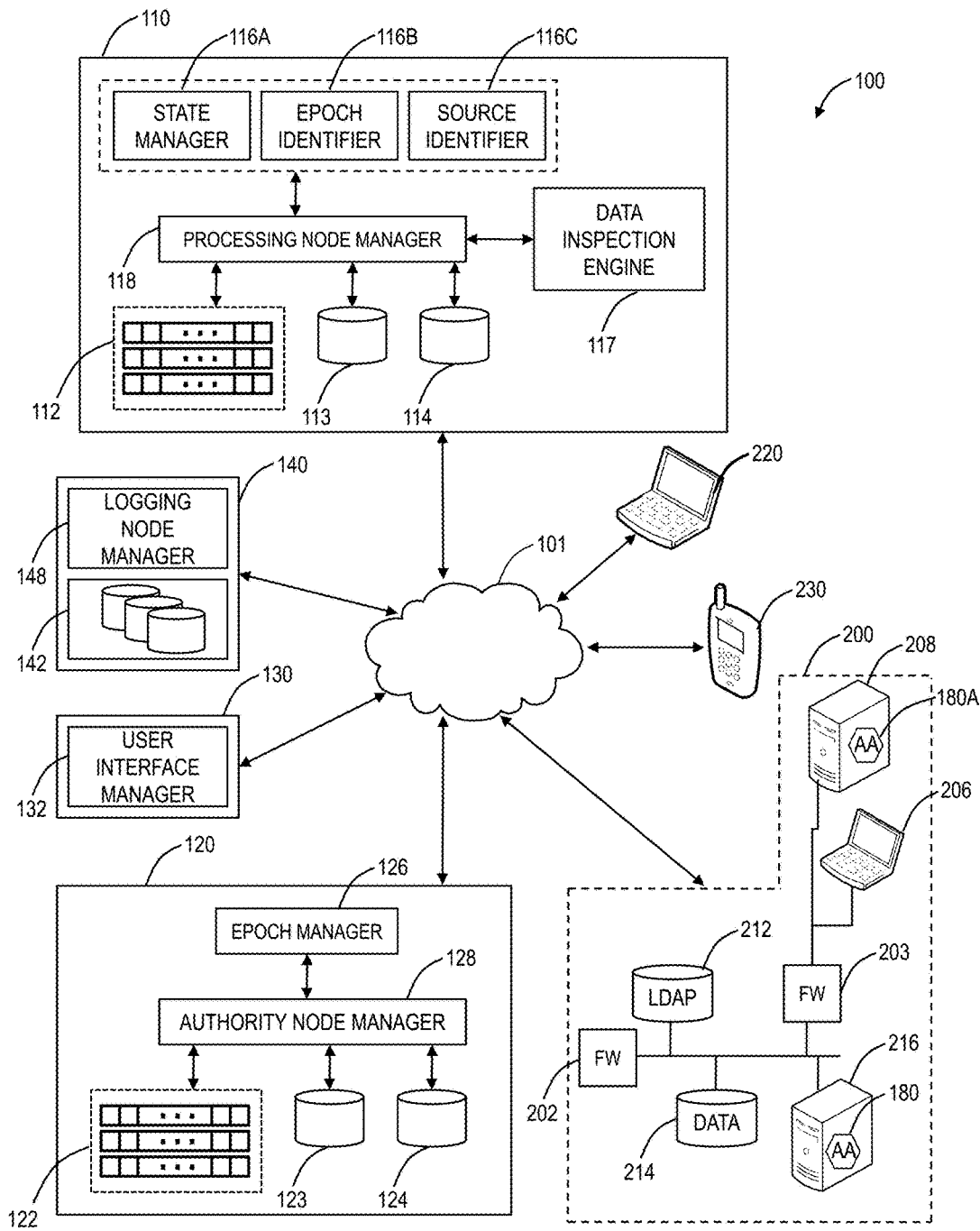
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§ 2.1 Example Processing Node Architecture

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
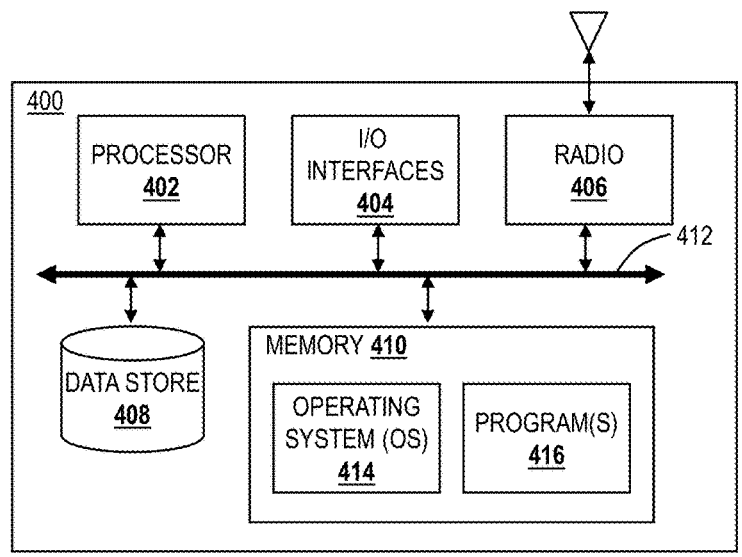
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
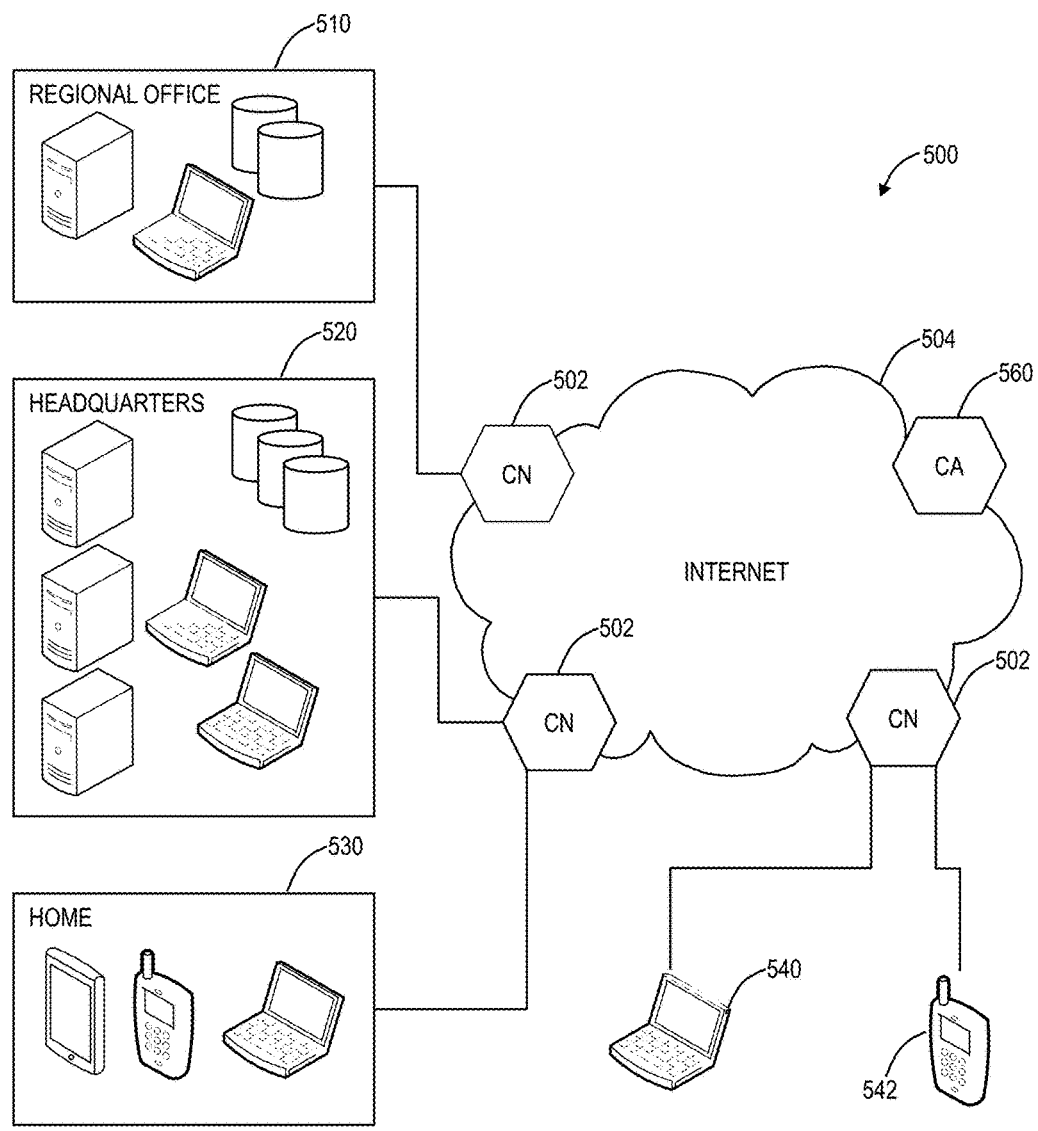
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 500 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
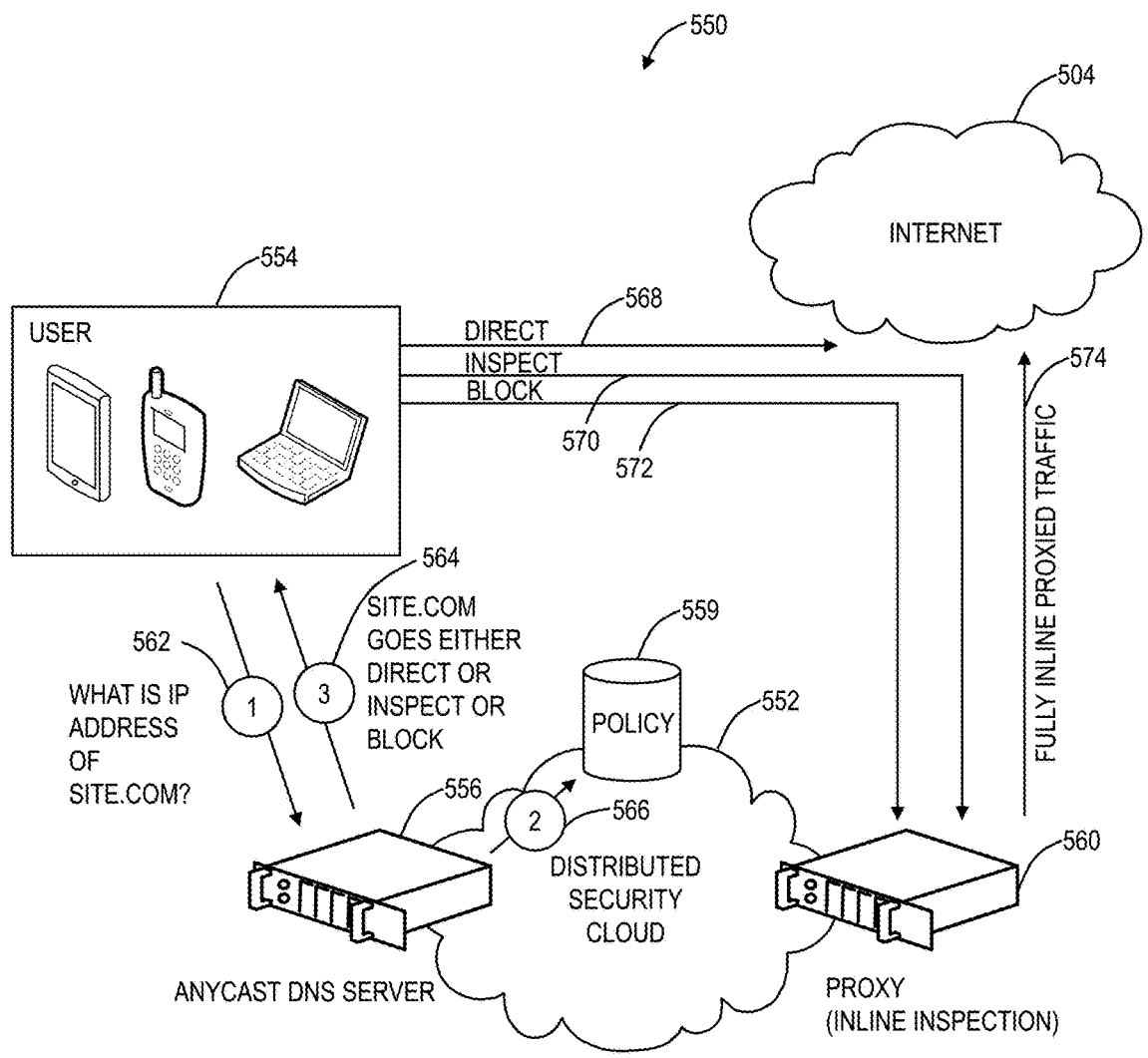
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully inline proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 Multi-Tenant, Cloud-Based Firewall

Figure 7:
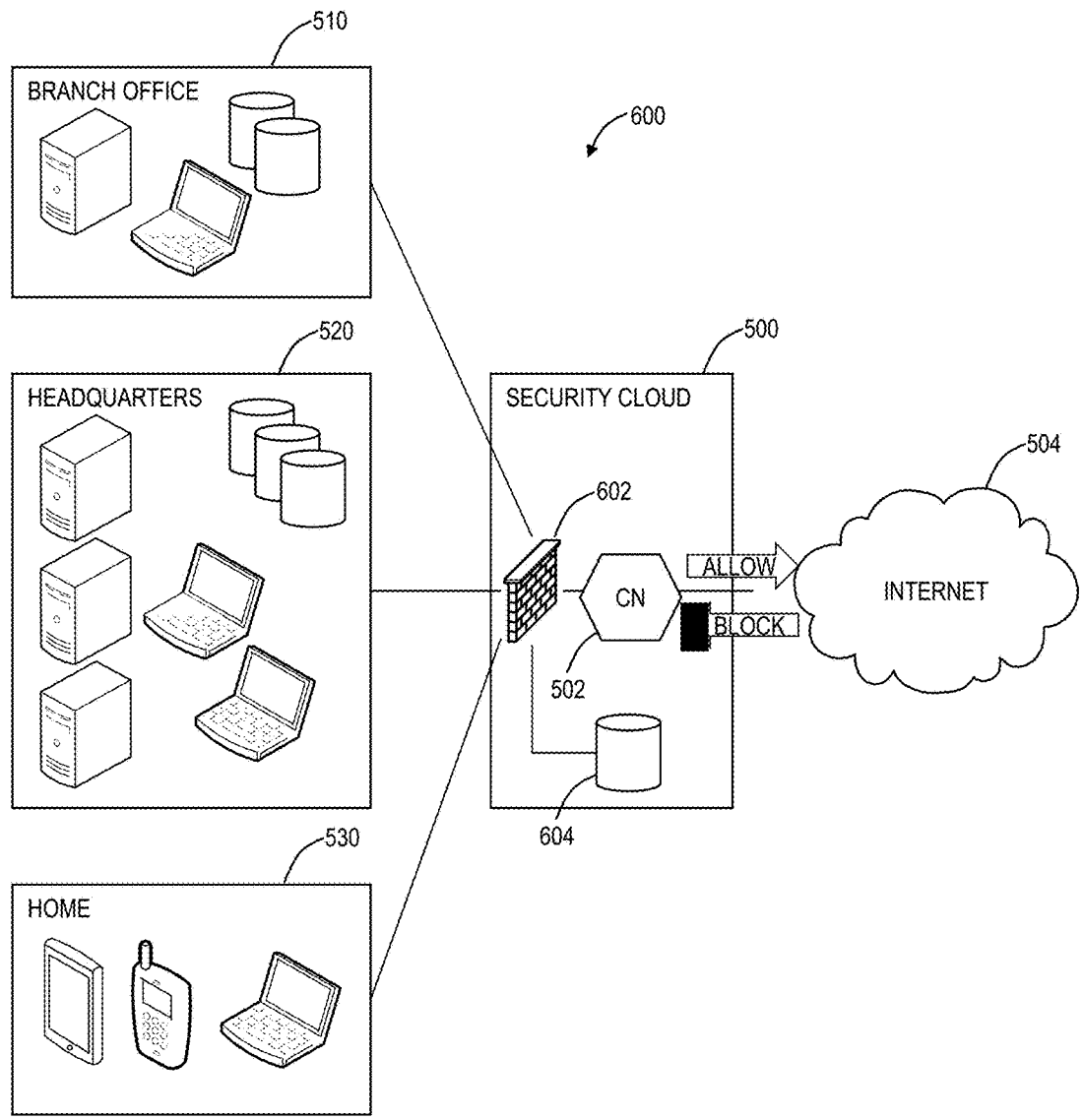
FIG. 7 is a network diagram of a network with a firewall in accordance with the multi-tenant cloud-based firewall systems and methods.

Referring to FIG. 7, in an exemplary embodiment, a network diagram illustrates a network 600 with a firewall 602 in accordance with the multi-tenant cloud-based firewall systems and methods. The firewall 602 is functionally deployed through the cloud system 500 where traffic from various locations (and various devices located therein) such as a regional office/Branch office 510, headquarters 520, various employee's homes 530, mobile laptop 540, and mobile device 542 communicates to the Internet 504 through the cloud nodes 502. The firewall 602 can be implemented through the cloud node 502 to allow or block data between the users and the Internet 504. The firewall 602 could also be implemented through the processing node 110. Note, in the various descriptions that follow, reference is made to the cloud node 502, but those of ordinary skill in the art will recognize the processing node 110 can be used as well or any other type of server or node. Further, the firewall 602 can be communicatively coupled to a log 604 for logging associated data therein. In an exemplary embodiment, the cloud nodes 502 can be used only to provide the firewall 602. In another exemplary embodiment, the cloud nodes 502 can provide the firewall 602 as well as in-line inspection. The firewall 602 can handle various types of data, such as, for example, Session Initiation Protocol (SIP), Internet Message Access Protocol (IMAP), Internet Relay Chat (IRC), Simple Mail Transfer Protocol (SMTP), Secure Shell (SSH), and the like.

Users connect to the cloud system 500 via Internet Protocol Security (IPsec) or GRE, all traffic including non-HTTP traffic may be sent through the cloud nodes 502. The firewall systems and methods propose to add support for non-HTTP applications to the cloud nodes 502. Thus, the cloud system 500 is able to support non-Web traffic and act as a Firewall for the Branch office, where clients typically sit behind a hardware-based firewall to connect to servers outside the hardware-based firewall. The firewall 602 provides advanced security functionality in the cloud can be used to offload Branch office Customer Premises Equipment (CPE).

Advantageously, in the cloud system 500, processor and resource intensive features are scalable, efficiently used for multiple customers, and inexpensive, relative to on-premises hardware-based solutions. The firewall 602 can be used to replace traditional expensive appliance box solutions that reside at the customer premise with service from the cloud system 500. This enables end customers to realize cost savings, provide efficient growth, and unified management/reporting. For example, the cloud system 500 scales while appliance box solutions do not. On-premises hardware-based solutions are often integrated with feature-rich routers or operate as a stand-alone device. In both scenarios, the firewall 602 can provide cost savings, either removing the need for the stand-alone device or allowing the use of lower cost routers and/or lower cost firewalls. The firewall 602, through the cloud system 500, can offer granular Layer 3 (L3) through Layer 7 (L7) control of applications, in a multi-tenant cloud infrastructure. This also includes integrated logging functionality, giving customers visibility into applications down to the L3 applications running on their networks.

§ 7.1 Multi-Tenant, Cloud-Based Firewall—Use Cases

Figure 8:
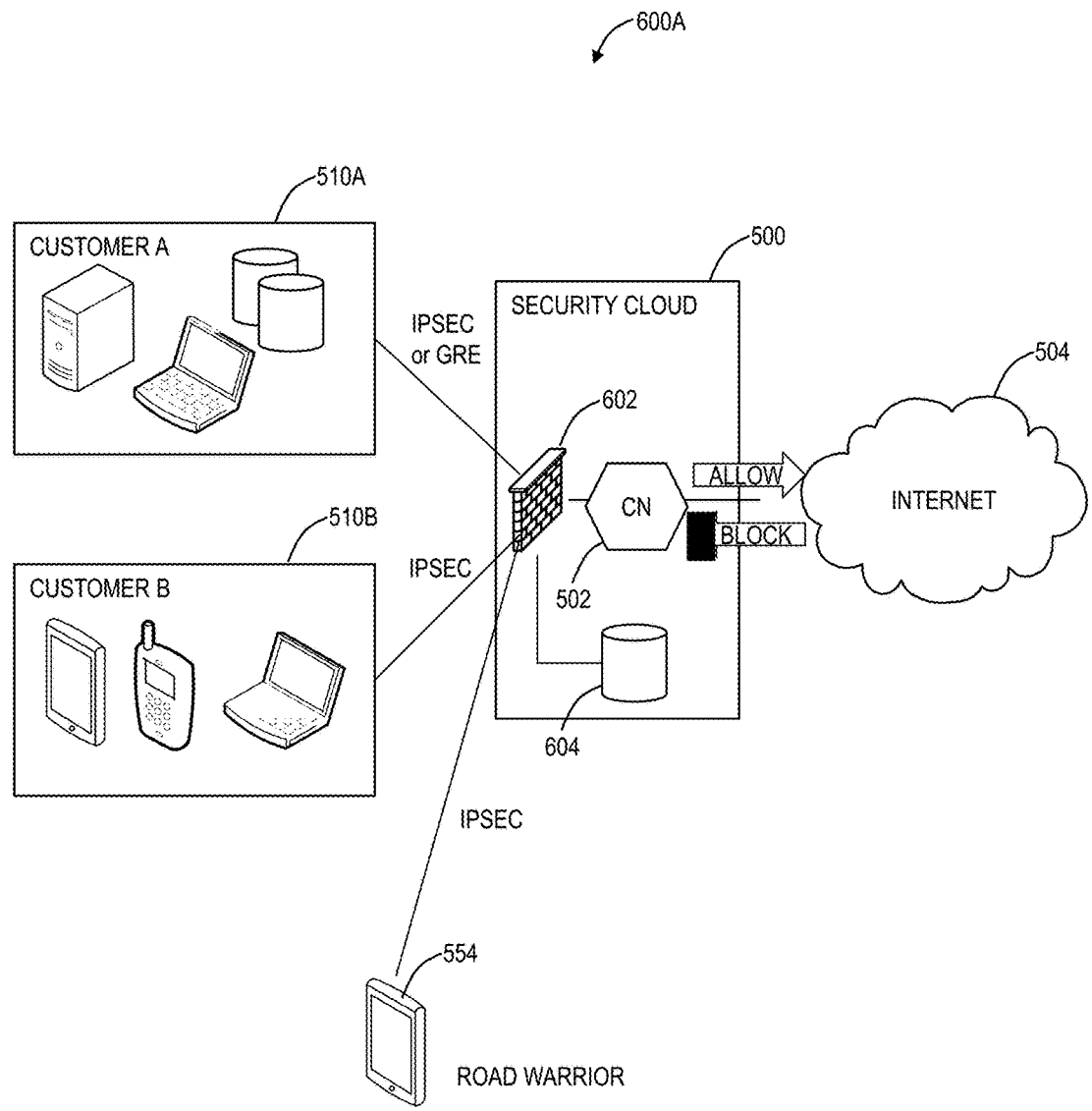
FIG. 8 is a network diagram of a network illustrating exemplary use cases of the firewall.

Referring to FIG. 8, in an exemplary embodiment, a network diagram illustrates a network 600A illustrating exemplary use cases of the firewall 602. Here, the firewall 602 can support multiple customers, such as regional office/Branch offices 510A, 510B. That is, the cloud system 500 can support the firewall 602 for more than one customer at a time. Additionally, the firewall 602 can support a road warrior, i.e., the user device 554, outside the office.

In an exemplary embodiment, the firewall 602 can be an outbound firewall for a Branch office, such as for large distributed enterprises, medium size business, small business, and the like, with users sitting behind the firewall 602 and connecting to the cloud nodes 502 which allow outbound connections of various protocols. Traffic can come to the firewall 602 via IPSEC or GRE tunnels. Traffic can also come to the firewall 602 in a Layer 2 (L2) Transparent Mode where Virtual Local Area Network (VLAN) tags are used, such as a specific tag mapped to a particular customer. In another exemplary embodiment, the firewall 602 can be an outbound firewall for Branch offices for Managed Service Provided, replacing existing managed firewall servers where large amounts of appliances are installed in data centers.

The firewall 602 also can provide basic stateful firewall functionality for common Layer 3 (L3) applications, allowing for the configuration of any one of these applications to traverse through the firewall 602. The user will now be capable of managing and controlling which protocols and applications are allowed through the firewall 602 and which ones are dropped.

For example, Telnet traffic can be configured to be allowed and all other non-HTTP/HTTPS traffic to be dropped. Inbound functionality or any connections initiated by users coming from the Internet 504 can also be supported. The firewall 602 also includes an ability to support configuration policy rules and the ability to log all traffic and generate reports for the customer.

In an exemplary embodiment, the regional office/Branch offices 510A, 510B can each connect to the cloud system via an IPSec tunnel, configured for all traffic, including non-HTTP/HTTPS. This traffic can be Network Address Translation (NAT) out to the Internet 504 and return traffic is passed back through the appropriate tunnel. Because the cloud system 500 knows which customer and which location traffic originated, the return traffic can be mapped properly and sent back through the appropriate VPN tunnel, even though customers may have overlapping private address spaces.

§ 7.2 Multi-Tenant, Cloud-Based Firewall—Functionality

A firewall service is defined to be a traditional Layer 4 (L4) service that can be defined by ports and Ethernet protocol (Telnet, SSH, POP, IMAP, etc.). Firewall applications are defined as Layer 7 (L7) applications (e.g., Lync, Skype, YouTube, etc.). The firewall 602 enables custom firewall services to allow users to define their own pin holes through the FW firewall 602 if a pre-defined firewall application does not exist. This will be known as a custom defined application which requires support for the custom application name and the configuration of ports or port ranges. This custom defined application can override any pre-defined applications, and the custom defined application cannot be defined with conflicting port ranges.

The firewall 602 can support pre-defined applications including, but not limited to, the following:

| | |
|---|---|
| HTTP | Port 80 |
| HTTPS | Port 443 |
| SMTP | Port 25 |

| | |
|---|---|
| File Transfer Protocol (FTP) control and Data | Port 21 control, Port 20 data |
| ICMP | |
| Telnet | Port 23 |
| DNS | Port 53 |
| Network Time Protocol (NTP) | Port 123 (User Datagram Protocol (UDP)) |
| SSH | Port 22 |
| Post Office Protocol (POP) | Ports 109/110 |
| IMAP | Ports 143/220 |
| Remote Procedure Call | Port 111 |
| SNMP | Ports 161 (UDP)/162 (TCP/UDP) |
| BGP | |
| ActiveSync | |
| Secure SMTP (SSMTP) | Port 465 |
| Secure IMAP (IMAP4-SSL) | Port 585 |
| IMAP4 over SSL (IMAPS) | Port 993 |
| Secure POP3 (SSL-POP) | Port 995 |

The firewall 602 can also support HTTP/HTTPS on non-standard ports through customer definition.

§ 7.3 Application Support

The firewall 602 can provide application signature support which provides the visibility necessary for administrators to understand the applications running on the network including firewall services and applications. The application signature can detect a set of applications via a compiled signature database. The signatures are grouped into default groups with individual apps added to the appropriate group. A user can define a custom group and define which group an application resides. Signatures for custom applications are user definable (typically through a Regular Expression (regex) engine).

FIG. 9 is a screen shot associated with the firewall 602 illustrating exemplary network services. Specifically, the firewall 602 includes several predefined services based on ports. Further, users can create their own customer services and service groups. FIG. 10 is a screen shot associated with the firewall 602 illustrates exemplary applications. In an exemplary embodiment, the firewall 602 can support thousands of applications (e.g., approximately 1200 applications), covering Peer-to-Peer (P2), Instant Messaging (IM), port evasive applications, streaming media, and other applications. Again, because the firewall 602 is multi-tenant and distributed (e.g., worldwide), new services and applications can be added instantly, across all customers and locations.

Figure 11:
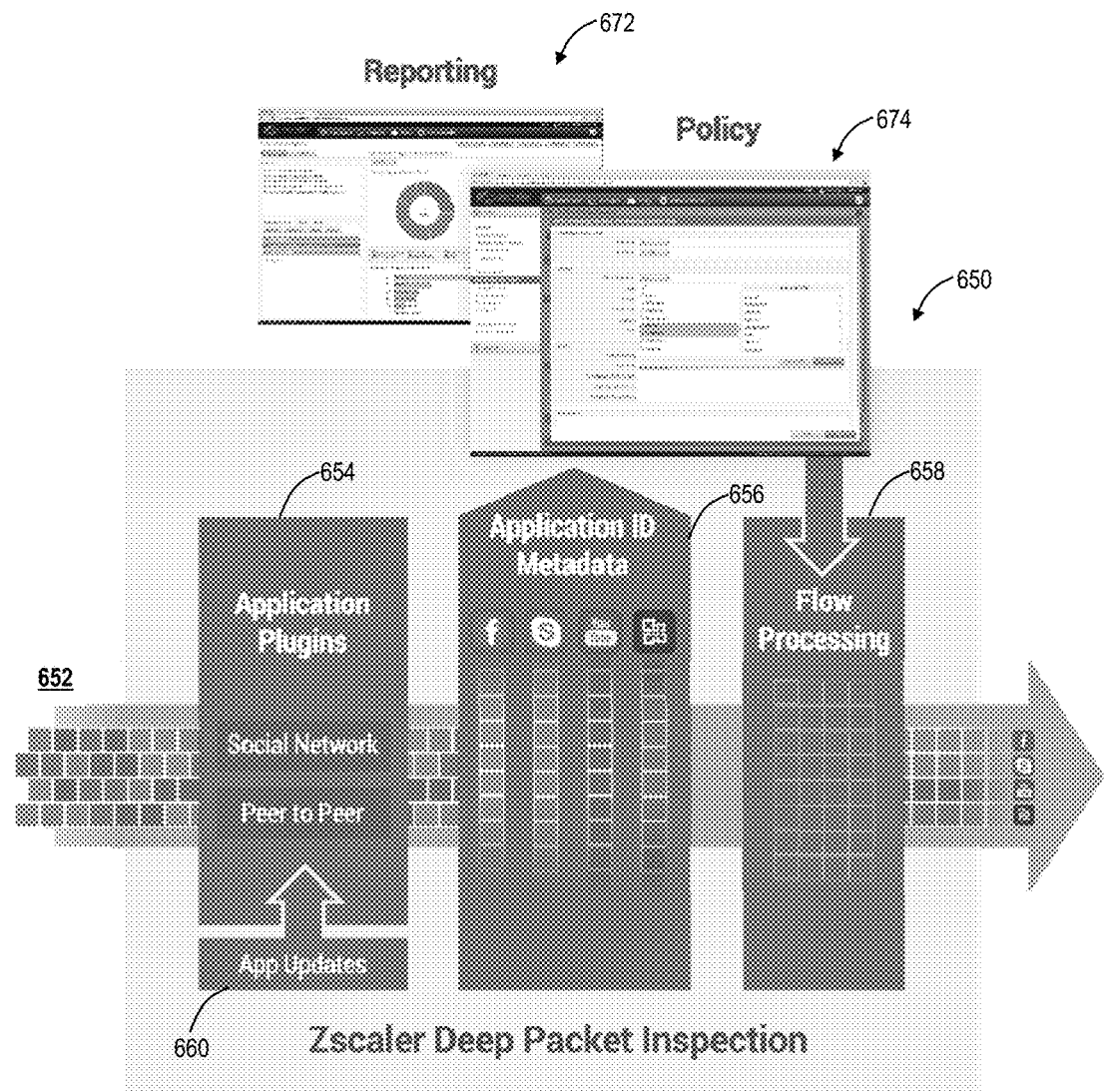
FIG. 11 is a diagram of a Deep Packet Inspection (DPI) engine for the firewall.

Referring to FIG. 11, in an exemplary embodiment, a diagram illustrates a Deep Packet Inspection (DPI) engine 650 for the firewall 602. The DPI engine 650 is part of or works with the firewall 602 to categorize incoming packets 652 to the firewall 602. The DPI engine 650 includes application plugins 654, application ID metadata 656, and flow processing 658. The application plugins 654 is configured to receive application updates 660 that can be regularly or periodically provided by the cloud system 500. Through the application updates 660, the firewall 602 can support more than the approximately 1200 applications. The application ID metadata 656 provides details on how different applications are detected. The flow processing 658 operates on the incoming packets 652 using the application ID metadata 656 to determine applications associated with the incoming packets 652. The flow processing 658 identifies the protocol and application behind each IP flow of the packets 652 using stateful inspection and heuristic analysis through the extraction of metadata from protocols (e.g. app info, volume, jitter) and does not requires SSL decryption. If the DPI engine 650 cannot classify app traffic, it will be categorized as either TCP, UDP, HTTP, or HTTPS. The DPI engine 650 can provide reporting 672 data to the log 604 as well as receive policy 674 updates.

The DPI engine 650 can use various classification methods including explicit, Protocol Data Signature(s), Port-based classification over SSL, IP protocol number, pattern matching, session correlation, and the like. Explicit classification is at a bottom layer where a protocol is identified by information found in the layer below. For example, the IP protocol includes a field called "protocol" defining the protocol embedded in its payload. The Protocol Data Signature(s) is through a Protocol Data Engine. When parsing the HTTP, SSL, and Real Time Messaging Protocols (RTMP) protocol headers, the Protocol Data Engine can look at a combination of specific value such as HTTP: Server, HTTP:Uniform Resource Indicator (URI), HTTP: User_agent, RTMP:page_Uniform Resource Locator (URL), SSL:common_name, and classifies the upper protocol using this information. For example, Facebook is classified after seeing an HTTP host matching *.facebook.com or *.fbcdn.net. In an exemplary embodiment, the DPI engine 650 was shown to take about 20 packets in order to detect the application.

For Port-based classification over SSL, in order to classify flows on top of SSL, the TCP port can be used in order to differentiate HTTPS, IMAPS, POP3, etc. For example, POP3 is classified in the SSL TCP port 995. For IP protocol number, this is a subset to the explicit classification for protocols above IP. As described above, protocols above IP are explicitly specified in the IP protocol. For pattern matching, content parsing is used to identify the protocol. For example, the pattern matching searches for multiple patterns such as HTTP/1.[0|1], [GET|POST|HEAD|CONNECT-|PUT|DELETE], and the like. For session correlation, information is required extracted from another flow in which the other protocol negotiated an IP and port for opening a new flow. For example, FTP-data by itself is only a binary streamed over the network and does not provide any information for classification. The only way to classify it is by using information from the FTP session leading to the opening of this flow in which FTP is specifying the IP and port to use for the ftp_data session.

Figure 13:
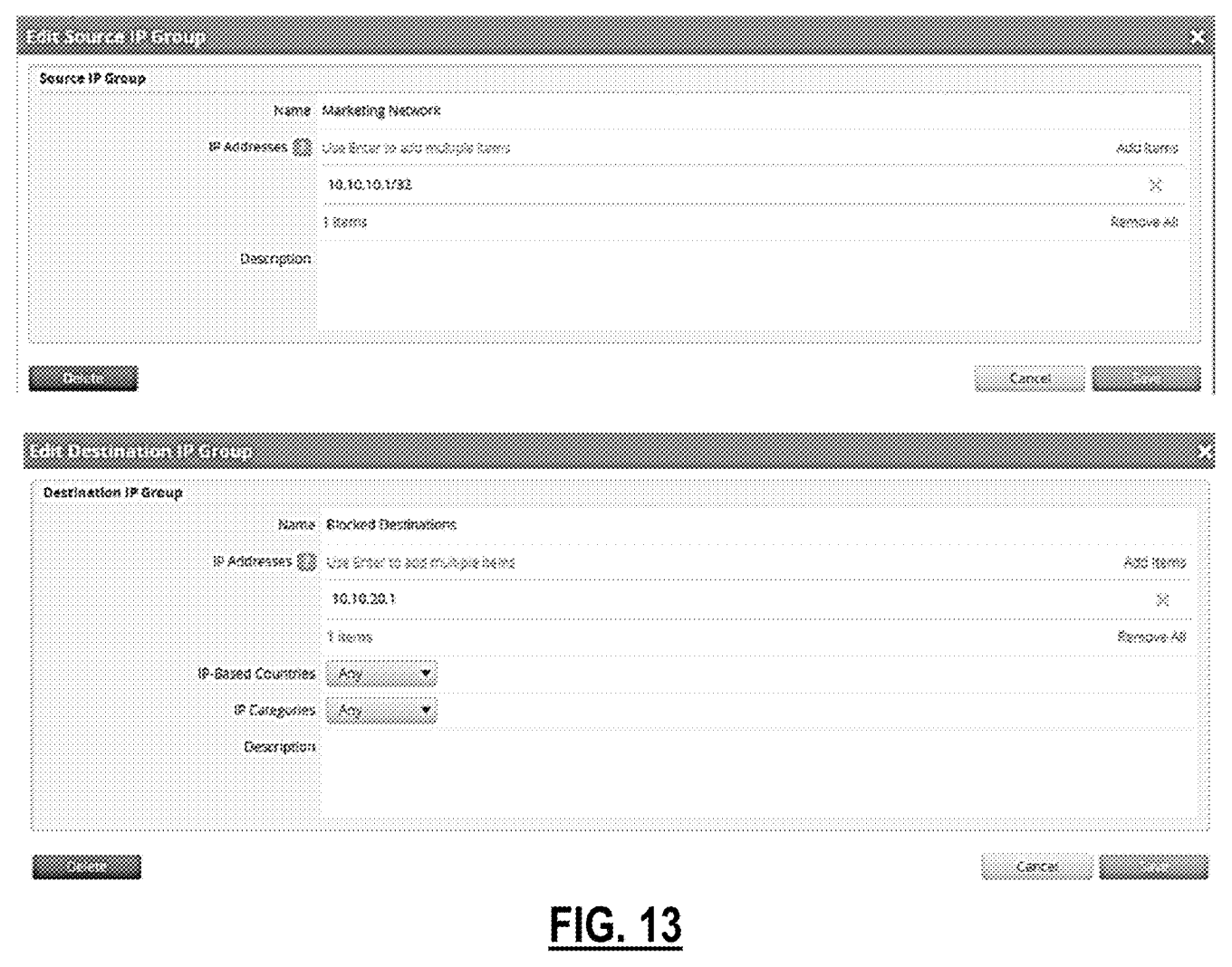
Figure 14:
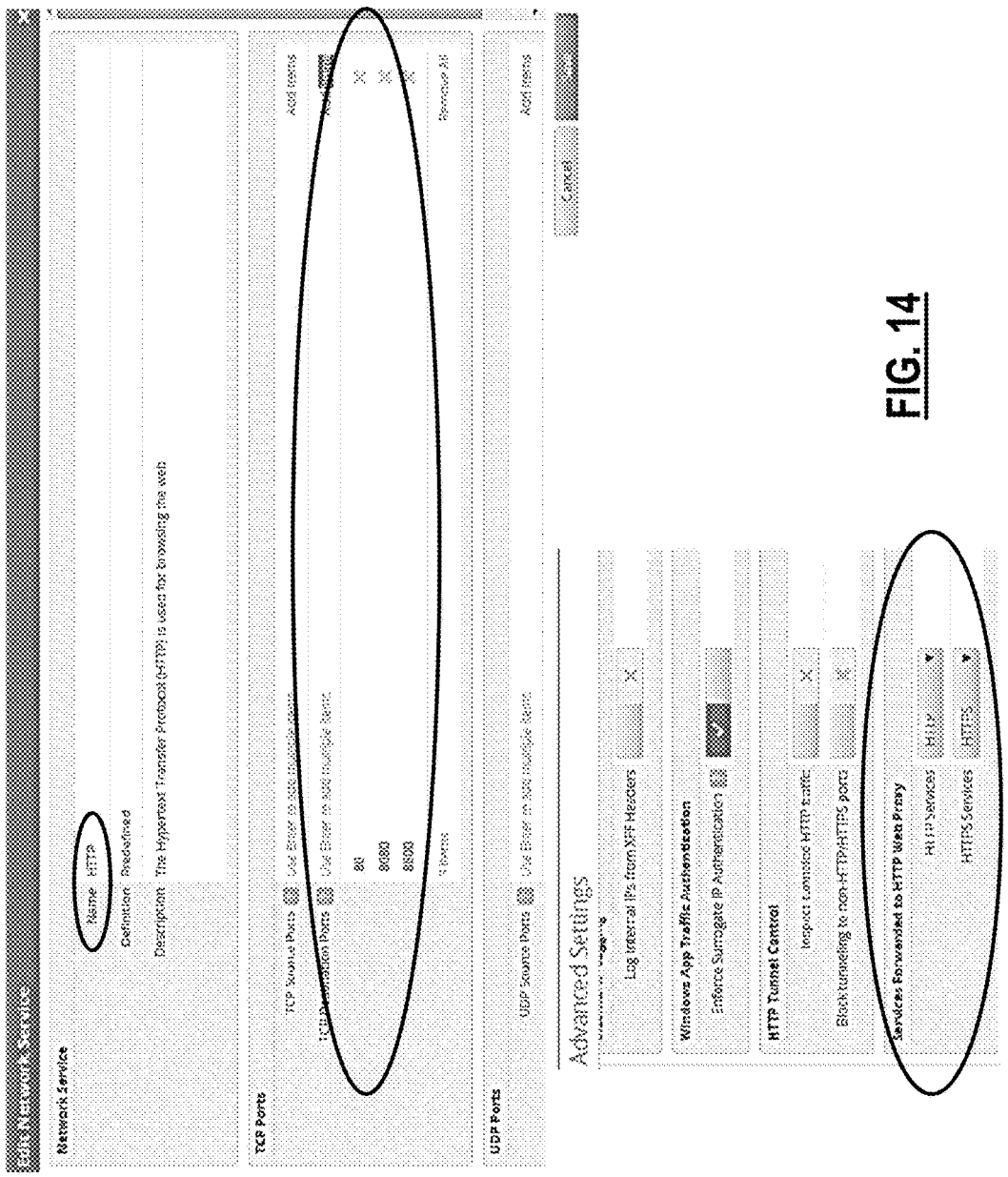
FIG. 14 is screen shots of editing a network service.

FIG. 13 is screen shots of editing IP groups. Specifically, FIG. 13 illustrates editing a source IP group and editing a destination IP group. IP groups can be predefined for the internal network and destination IPs. Destination IPs can be configured with IP-based countries and IP categories. FIG. 14 is screen shots of editing a network service. The firewall 602 can include editing HTTP and HTTPS network services to include non-port 80/443 ports, including configured ports that are not used in other services.

§ 8.0 Policy

A firewall policy (or rule) is an exact description of what the firewall 602 is supposed to do with particular traffic. When enabled, the firewall 602 always have at least one active rule, although usually multiple rules are employed to differentiate traffic varieties by {source, destination, and application} and treat them differently. In general, firewall policy consists of matching criteria, an action, and some attributes: rule_rank rule_label [who] [from] [to] [network service] [network application] [when] action [action restrictions] [rule status] [logging]

The firewall 602 supports a policy construct, to determine where firewall policy is enforced during an overall order of operation of packet flow through the cloud node 502. In an exemplary embodiment, there are three types of policy, namely firewall policy, NAT policy, and DNS policy.

The firewall policy construct supports a rule order, status, criteria, and action. Policies are matched in the rule order in which they were defined. The status is enabled or disabled. The matching criteria can include the following:

| | |
|---|---|
| From | Location, Department, Group, IP Address, IP Address Group, IP address Ranges, User, and/or User Group |
| To | IP address, Address Group, Domain Name or countries |
| Firewall service(s) | L4 services as listed above, and new services may be defined by Source IP, Destination IP, Source Port, Destination Port, and Protocol |
| Firewall application(s) | L7 application supported by a Deep Packet Inspection (DPI) engine |
| When | Schedule |
| Daily quota | Time or bandwidth, allowing the user to configure the amount of time or bandwidth a user is allowed for a certain application. |
| Action | Allow or block by either dropping traffic or by sending TCP reset |

All components of the matching criteria are optional and if skipped imply "any." A session matches a rule when all matching criteria components of the rule are satisfied (TRUE) by the session. If a session matches any element of a component (i.e. one of the IPs in a group), then the entire component is matched.

A rule might be configured as either company-wide, or restricted to up to a certain number of locations, or up to a certain number of departments, or up to a certain number of users. Some rules might extend their coverage to the entire cloud (SNATor tracking rules), applying to every company in the cloud. Source/destination IPs are a group of the following in any number/combination. It is used to match session source/destination IPs: ● individual IP, i.e. 192.168.1.1; ● IP sub-net, i.e. 192.168.1.0/24; ● IP range, i.e. 192.168.1.1-192.168.1.5. Note that there is no special support for IP range exclusions; ● IP category. Same as URL category and comes from a database. Custom categories are supported. Applicable to destination IPs only; ● country—matches any IP that belongs to this country, i.e. "Russia". Applicable only to destination IPs; ● domain name—any destination IPs behind this name matches this criterion. For example, any IP that matches "skype.com". Data plane builds an IP cache to match the names from DNS requests coming from the clients.

A network service is a group of {TCP/UDP, {src/dst port(s), or port ranges, or port sets}} or just ICMP. Network service defines an application based on L3/L4 information of the first packet in a session. Following is restrictions and implementation details: Each network service can be identified either by its name (aka label) or invisible for customer slot number in the range from 0 to 127. The slot number is required for firewall logging. Following slot numbers are reserved to simplify data plane implementation: ● 0—predefined customizable HTTP service group; ● 1—predefined customizable HTTPS service group; ● 2—predefined customizable DNS service group; ● 3-5—reserved for future use; ● 6—ICMP any. This service covers ANY ICMP traffic; ● 7—UDP any. This service covers ANY UDP traffic—port from 0 to 65535; ● 8—TCP any. This service covers ANY TCP traffic—port from 0 to 65535; ● 63—OTHER. This service covers all network services that don't match any predefined or custom services. Basically, it will catch all protocols other than ICMP, UDP, and TCP. ● 64—is the very first slot of the custom services. The customer can be allowed to alter (add, modify or delete) protocol and ports in all predefined services except ICMP any, UDP any, TCP any and OTHER. Although the customer is not allowed to delete a predefined network service, or modify its name, or delete all protocol/port entries in a particular predefined service. Different services must not have overlapping ports for the same protocols. The only exception is predefine *_any services. Data plane chooses more specific network service for logging. For example, if session matches 2 network services TCP any and SSH then SSH is logged for this session.

The network application is defined based on L7 info. This is preconfigured for the cloud and comes only from the DPI engine 650. Rank is the priority of the rule. Rank is needed to resolve conflicts when a session matches more than one rule. The highest priority rule (the least rank number) takes precedence;

A Rule's action defines what should be done with the matching session. There might be several actions required to apply to a single session. For example, the first action lets the session go through (allow), a next action tells of tracking the session using state-full TCP proxy, next is to apply source NAT to the session, and final action redirects the session to a preconfigured IP. All these different actions belong to different rules. In other words, if the firewall 602 can apply up to 4 different actions to a single session it's required to fetch up to 4 different policies for that session. To minimize the number of rules shown to the user front end might want to plump different rule types into a single rule as far as matching criteria is the same for those rules.

Here are exemplary supported types of policies categorized by action type: ● filtering policies—to allow or block sessions; ● tracking policies—tell how to track allowed sessions—state-fully or statelessly; ● SNAT policies—dictate how to apply source NAT; ● DNAT policies—configures destination NAT; ● bandwidth control policies; ● DNS policies—provide DNS-specific actions. Tracking, SNAT and DNAT policies must be enforced at the first packet. Hence, they do not support network application matching component since its evaluation takes several packets. Action restrictions allow to modify rule action depending on some dynamic info. For example, the customer might want limit total time or bytes per day of youtube.com traffic.

Depending on the action there are different types of rules. The following types can be supported: ● filtering rules are evaluated first. Monitored rule status overrides (only) filtering rules action—makes it allow without any restrictions. This type of rules is user configurable. They provide following actions: ● allow—pass to the evaluation of other types of rules. This action might have an additional restriction for daily time/bandwidth quota; ● block_drop—silently drop all packet that match the rule; ● block_reset—for TCP sessions send TCP reset to the client. For non-TCP traffic act same as block_drop; and block_icmp—response to the client with ICMP error message type 3 (Destination unreachable), code 9 or 10 (network/host administratively prohibited).

Tracking rules provide—state-full or stateless action. Only OPs configure this type of rules; they are hidden from the user. The granularity of who component in the matching criteria should be from user to cloud wide.

SNAT rules dictate which type of outbound IP should be used for all the traffic matching such rule. Two types of outbound IPs are supported—open and secure. SNAT rules are applied to all outbound traffic, and there is no way to disable it. These rules might be configured by OPs only. The only purpose of SNATrules is to isolate harmful traffic from the rest of the clients. Requires persistence on SME. The granularity of who component in the matching criteria should be from user to cloud wide.

DNAT (redirect) rules provide destination IP and port (as the action attribute). They tell where the client side traffic has to be redirected. Port is optional and when is not specified firewall does not alter destination port. DNAT is user configurable.

A Rule's attributes include: ● rule rank—reflects the priority of the rule comparing to the other rules; ● rule label—rule specific label (or name) which is shown in firewall reports. This is a way to match configuration and reporting; ● rile status—administrative status of the rule—enabled, disabled or monitor; ● logging—tells how to log sessions created via this rule.

The NAT policy construct includes source NAT and destination NAT. For the source NAT, all applications including custom defined applications are NAT'ed with a public IP address associated with the cloud system 500 (source NAT'ed). All return traffic is received and sent back to the appropriate IPsec or GRE tunnel. It may be desirable from an operations perspective to have a different IP address for firewall source NAT'd traffic that for HTTP(S) source NAT'd traffic. This is to avoid blacklists between the two functionalities, so the firewall 602 customers do not accidently blacklist our HTTP only customers. For destination NAT (DNAT), in cases where the customer wants to force a protocol out a particular port DNAT will be required.

The DNS policy construct includes the following:

| | |
|---|---|
| To | IPs and countries |
| IP/domain category | Group of IP or domain categories derived |
| Network service | |
| Network application | |
| Action | Allow, block, redirect_request (to a different DNS server or substitute IP in response with pre-configured IP) |

DNS might be policed on the session as well as on transaction (individual request) levels. While session DNS policies have regular policy structure the DNS transaction policies are different:
rule_label [who] [from] [to] [IP/domain category] [when] action [action restrictions] [rule status] [logging]

The differences are: ● to—a group of IPs and countries. Note that IP categories should not be included here to avoid confusion. These are IPs or countries of the destination DNS server; ● IP/domain category—a group of IP or domain categories derived from ZURL DB. These categories are derived from matching DNS request domain or responded IP a database. Such separation of to (server IP) and IP/domain category allows to configure fine granular matching criteria like "malicious IP/domain request sent to specific DNS server"; ● network service—is not configurable here because DNS transaction policies get applied only to the sessions that matched predefined DNS service group; ● network application—is not configurable. There is no way to find application just by IP (w/o port/protocol). This finds out the application when a client comes with a session using resolved IP as destination IP. Besides URL category lookup does not return application ID. The application requires one extra look up; ● action—actions applied only to DNS transactions. It includes allow, block, redirect request (redirect to a different DNS server), redirect_response (substitute IP in response with preconfigured IP). Rules with redirect_request action can be applied only to the request phase of DNS transaction. Rules with redirect_response action are applicable only to the response phase of DNS transaction.

And finally rules with allow or block actions are evaluated during both phases (request and response) of DNS transaction.

Figure 12B:
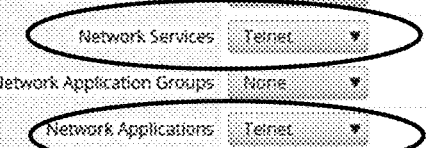
FIG. 12B is another screen shot of defining a firewall filtering rule.

The firewall 602 can support various policies, e.g., 128 policies, 1024 policies, etc., including variable locations, departments, and users per policy. Again, since the firewall 602 is multi-tenant, policies can be different for each customer as well as different for different locations, departments, and users per customer. For user-based policy, a specific user must have IP surrogation enabled for user tracking. FIG. 12A is a screen shot of defining a firewall filtering rule. The rule is named, has an order and rank, and is enabled/disabled. Matching criteria is set for the users, groups, departments, locations ● Who, From, To, Network Service, Network App, When. Finally, the action is determined—Allow, Block/Drop, Block with ICMP Error Response, Block with TCP Reset. FIG. 12B is another screen shot of defining a firewall filtering rule. Network service and network application criteria in the same rule results in a logical "AND" condition. In FIG. 12B, a Telnet network service on Port 23 and a Telnet network application on any port—"AND" results in telnet protocol as detected by the DPI engine 650 must be on port 23. Conversely, criteria within the same network service or network app are logical "OR."

Figure 15:
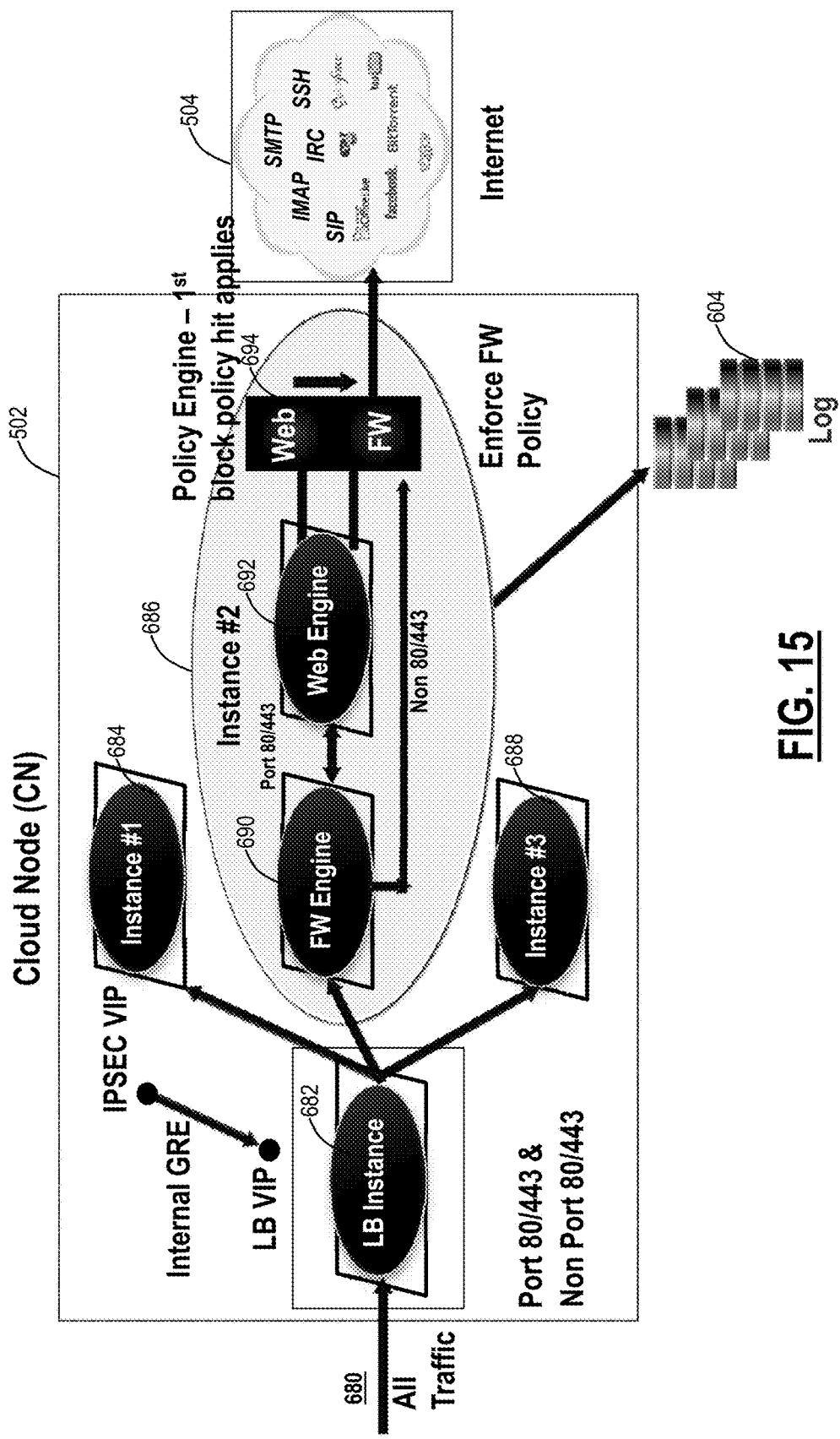
FIG. 15 is a flow diagram illustrates packet flow through the cloud node.

Referring to FIG. 15, in an exemplary embodiment, a flow diagram illustrates packet flow through the cloud node 502. Again, all traffic 680 between users and the Internet 504 is processed through the cloud node 502 (or the processing node). The traffic 680 can be received at a Location Based (LB) instance 682 which could also receive traffic from GRE, a Virtual IP (VIP) IPsec, a LB VIP, etc. From the LB instance 682, the traffic 680 is sent to one or more instances 684, 686, 688 (labeled as instance #1, #2, #3). For illustration purposes, the instance 686 is shown which includes a firewall engine 690, a Web engine 692, and a policy engine 694. The firewall engine 690 forwards on port 80/443 traffic to the policy engine 694 and port 80/443 traffic to the Web engine 692. If Web policy and FW policy are configured for a Web application, Web policy is applied first and then FW policy will be enforced. The policy engine 694 is configured to enforce Web and firewall policies and to send the traffic 680 to the Internet 504.

Figures 16, 17:
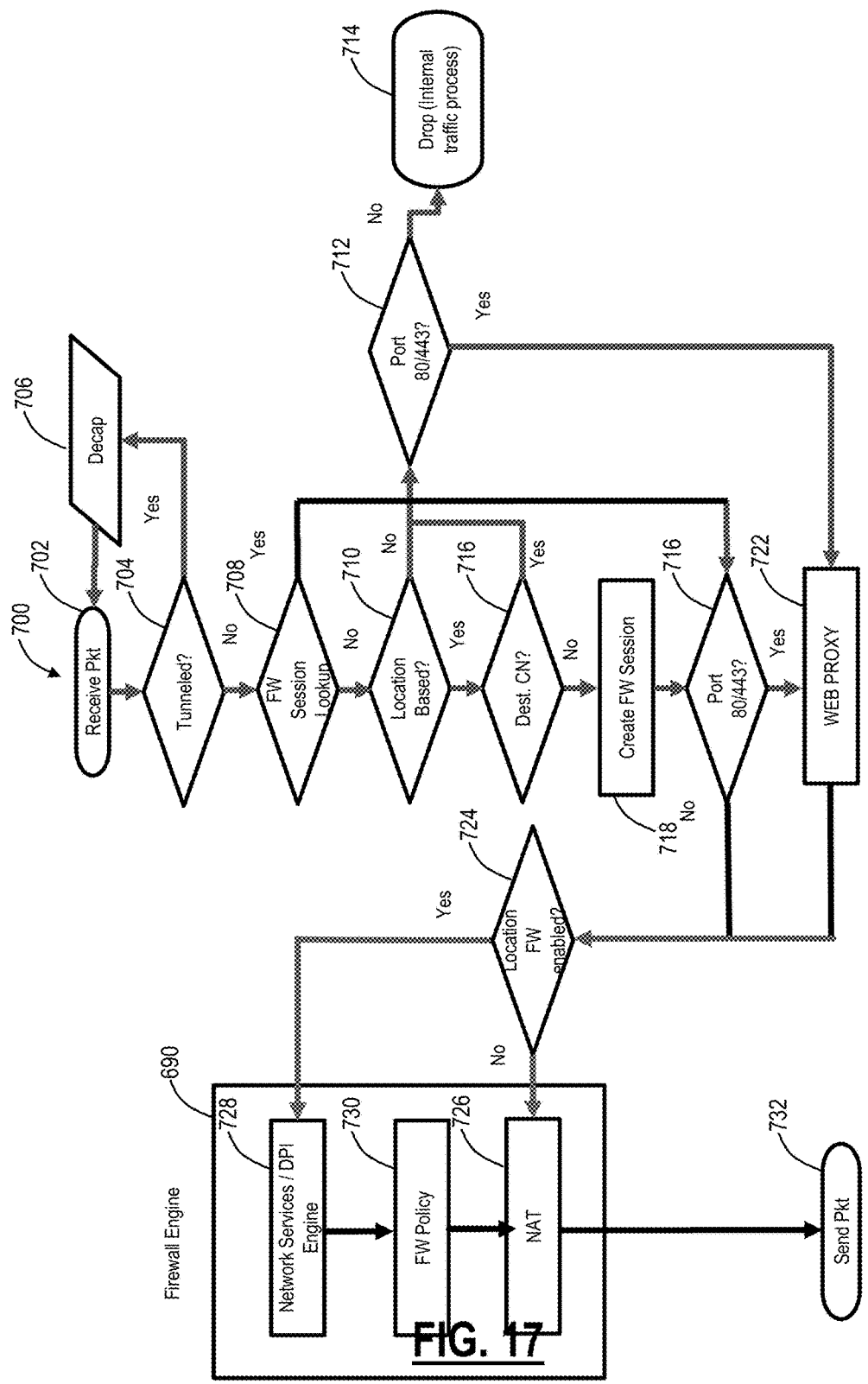
FIG. 16 is a flowchart of a process for packet flow through the firewall from a client.
FIG. 17 is a flowchart of a process for packet flow through the firewall from a server.
Figure 17:
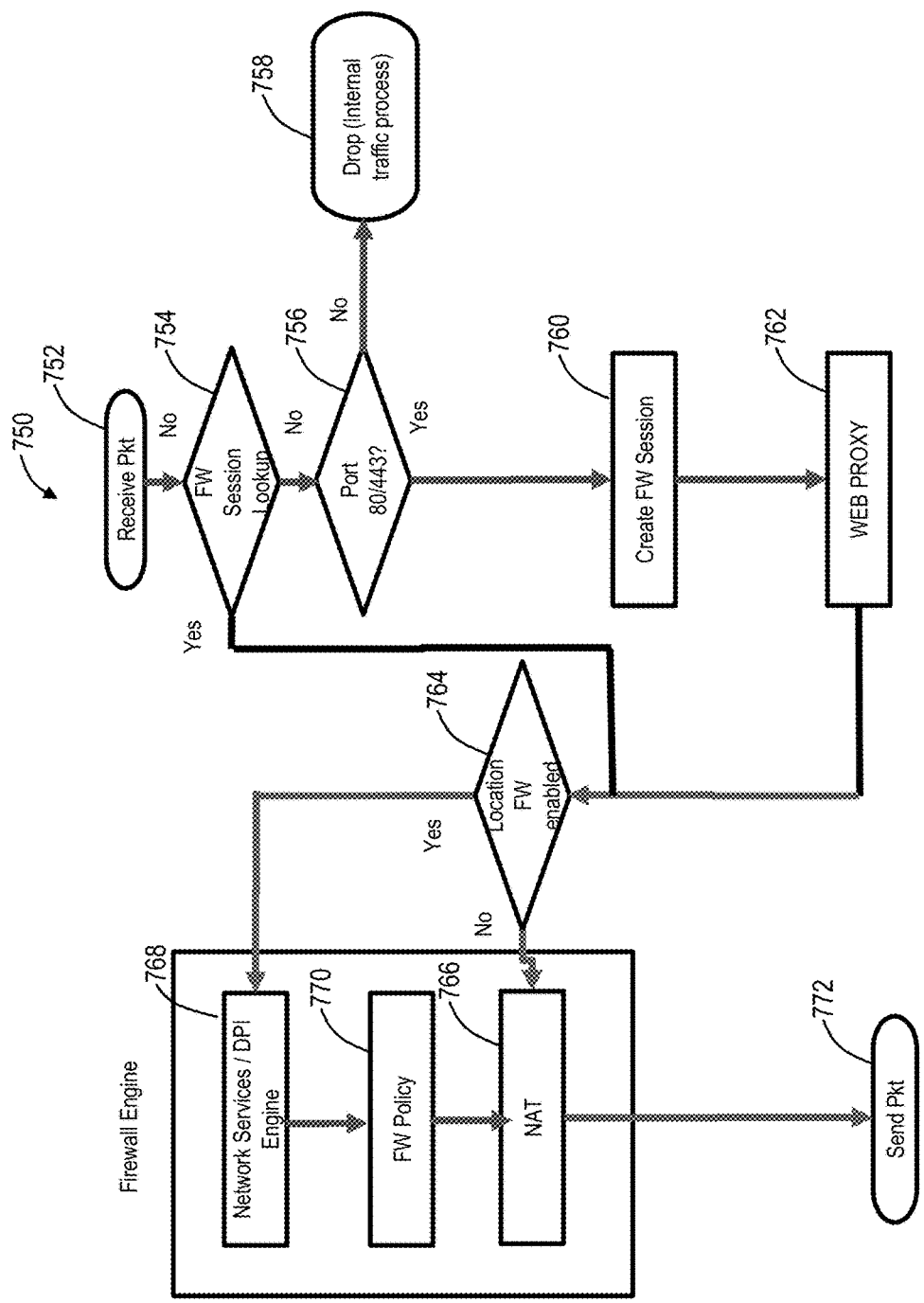

Referring to FIG. 16, in an exemplary embodiment, a flowchart illustrates a process 700 for packet flow through the firewall 602 from a client. The process 700 includes receiving a packet (step 702). If the packet is from a tunnel (step 704), the packet is de-encapsulated (step 706) and the process 700 returns to step 702. After step 704, a firewall session lookup is performed (step 708). If no firewall session exists, the process 700 checks if the packet is location based (step 710). If the packet is not location based (step 710) and not port 80/443 traffic (step 712), the traffic is dropped (step 714). If the packet is location based (step 710), the process 700 checks if the packet is destined for the cloud node 502 (step 716) and if so, moves to step 712. If the packet is not destined for the cloud node 502 (step 716), the process 700 includes creating a firewall session (step 718). After step 718 and if a firewall session exists in step 708, the process 700 checks if the traffic is port 80/443 (step 720), and if so, established a web proxy (step 722). After steps 716, 722, the process 700 checks is location firewall is enabled (step 724). If so, the traffic is processed by the firewall engine 690, and if not, the traffic is NAT'd (step 726). The firewall engine 690 analyzes the traffic through a network services/DPI engine (step 728), applies firewall policy (step 730), and the traffic is NAT'd (step 726). Finally, the packet is sent (step 732).

Referring to FIG. 17, in an exemplary embodiment, a flowchart illustrates a process 750 for packet flow through the firewall 602 from a server. The process 750 includes receiving a packet (step 752) and a firewall session lookup is performed (step 754). If no session exists, the process checks if the traffic is port 80/443 (step 756), and if not, drops the traffic (step 758). If the traffic is port 80/443 (step 756), a firewall session is created (step 760) and a Web proxy is performed (step 762). The process 750 checks is location firewall is enabled (step 764). If so, the traffic is processed by the firewall engine 690, and if not, the traffic is NAT'd (step 766). The firewall engine 690 analyzes the traffic through a network services/DPI engine (step 768), applies firewall policy (step 770), and the traffic is NAT'd (step 766). Finally, the packet is sent (step 772).

Every packet hits the firewall 602 which requires the firewall 602 to process packets as efficiently as possible. This is achieved by having slow and fast paths for packet processing. The slow path deals with the very first packet of a new session. It is slow because the corresponding policy has to be found and firewall resources allocated (memory, ports, etc.) for the session. All packets of an existing session go through a fast path where only a simple lookup is required to find the corresponding session.

Here is a description of policy evaluation of a first packet in a session—the slow path:
every packet hits the firewall code first—it is intercepted on the ip_input( ) level;
if the packet destined to one of the cloud system 500's IP addresses, a pass up session is created, and the packet is forwarded up to the network stack. No firewall policy is evaluated in this case;
the who component of matching criteria is evaluated based on a combination of:
client IP— inner IP in case of tunnel or just client IP in case of L2 redirection; o tunnel info—outer IP of the tunnel;
default location IP if auth_default_location_ip is configured to 0 value in sc.conf. This IP is used as location IP and overrides any tunnel info;
based on the who value following actions might be taken:
if the packet came for a road warrior (no location is found for the client's IP) and status was ready at least once then pass up this session.
the packet came from a known location. If firewall functionality is disabled for the company—a pass up session is created, and packet gets forwarded to the networks stack.;
if the firewall is not configured for the location, a new session object gets created with allow action and the packet are SNATed out. The session is allowed to overcome rule infrastructure limitation of only up to 8 locations per rule—the i.e. company wants to disable FW in 100 locations out of 10000. Otherwise, firewall policy evaluation continues;
if firewall fails to retrieve company, location or user configuration due lack of resources (out of memory), then the packet is silently dropped. If config retrieval failure is due any other reason then the cloud wide default policy is applied to the session;
finally, if the firewall is configured for the client, and all configuration is available the session is treated per configured policies;
for policy lookup, firewall queries the configuration of the corresponding company, location, location user and if available surrogate IP user. Company config contains a list of all firewall rules. The location has the firewall enable/disable knob. And the two users configs tell which firewall rules are enabled for the particular location and particular surrogate IP user.
policy lookup is done to find the highest priority best-matching rule using all enabled rules for the location OR surrogate IP user. In other words, policy lookup evaluated all rules enabled for the location as well as for the surrogate IP user. Note that if a user belongs to a company A while coming to SME from location of company B then only location configured policies are applied to such user;
to determine network application (which mostly comes from layer 7) DPI engine usually have to see more than one packet. That is why all filtering rules with "other-than-any" network application component are replaced with similar rules where network application is any and action is allowed. Based on the result of the policy look up firewall creates a session object and acts accordingly. For example, a rule from_subnet_1 network_application_tor DENY for the first look up gets replaced with from_subnet_1 network_application_any ALLOW;
when several packets later network application are determined by DPI, it notifies firewall about the findings. At this point, firewall checks the original (non-modified) policies and if needed can correct actions applied to the session. Using the previous example, the DENY rule will be checked during this second policy look up.

Again, all traffic is inspected through the cloud node 502. Web Traffic (Port 80/443) is sent to the Web Policy engine 692. If firewall (non-port 80/443) is enabled then, all web traffic is sent to the firewall engine 690 for inspection. Firewall traffic is sent to the firewall engine 690 and will go through the firewall policy table. Web policies are inspected first. Firewall policies are enforced after all web policies. If there is a web allow policy, firewall policies are still evaluated.

FIG. 18 is a screen shot of creating firewall policies. The policies have an order, rule name, criteria, and action. Firewall policies start by defining the Network Services to Allow followed by Network Applications. A basic policy is defined to allow HTTP, HTTPS, and DNS traffic just before the default rule. Again, it may take up to 20 packets in order for the DPI engine 650 to detect the Application. If a packet hits a Network Application policy, and the DPI engine 650 cannot determine the Application, then the packet is allowed, and next rule is not evaluated. The next rule will be evaluated once the Application is determined.

Figure 19:
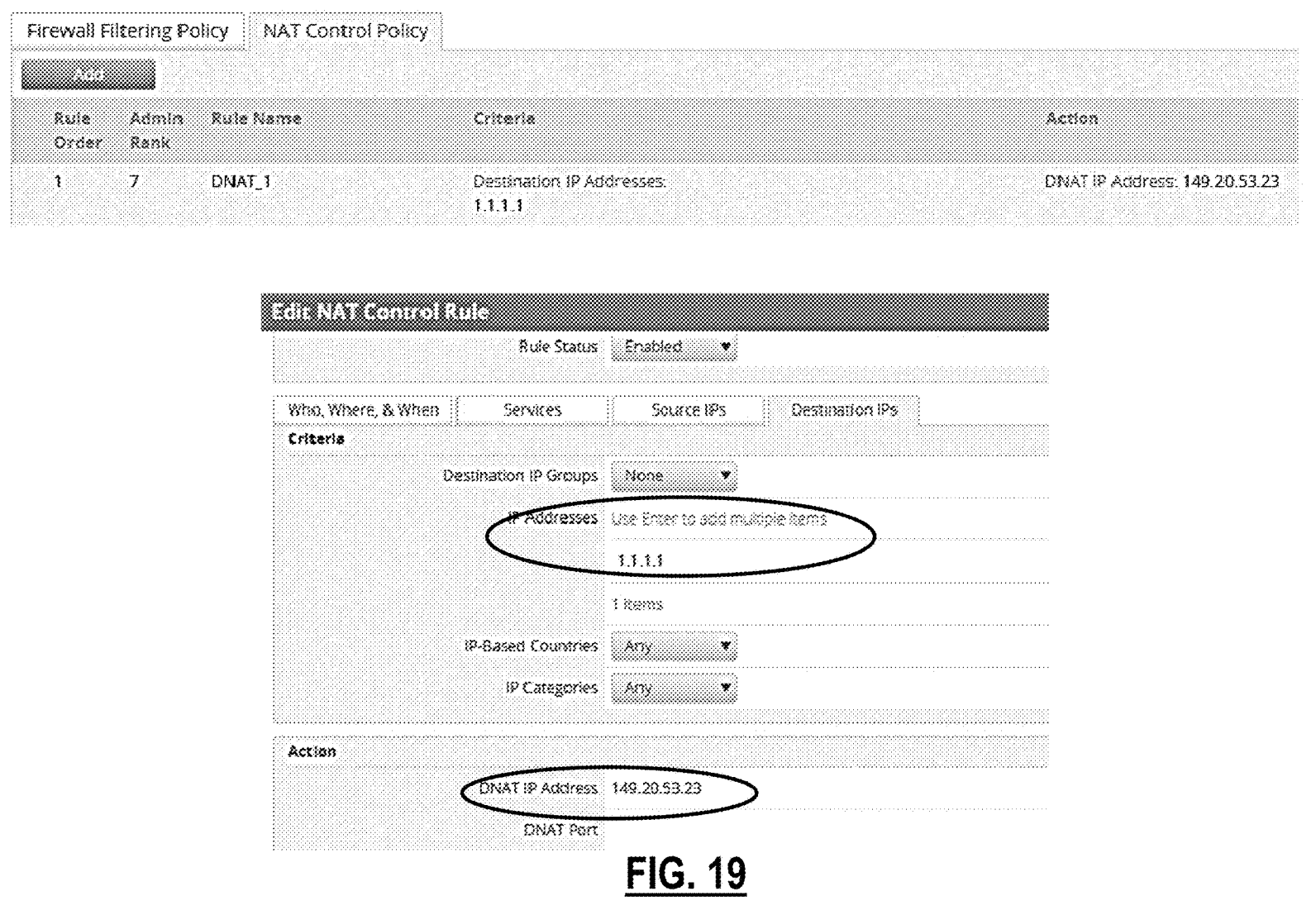

FIG. 19 is a screen shot of an NAT configuration. The firewall 602 can support destination NAT to redirect traffic to another IP and/or port. The use case is to control what resources a user can access. For example, a customer requires their users to go to an internal IP to access external non-web servers.

FIG. 20 is a screen shot of a user authentication screen. The user authentication can leverage existing authentication infrastructure in the systems 100, 500. In an exemplary embodiment, IP Surrogate is configured to map the IP address to the user. The user must authenticate with the Web first (or have a cookie stored).

Figure 21:
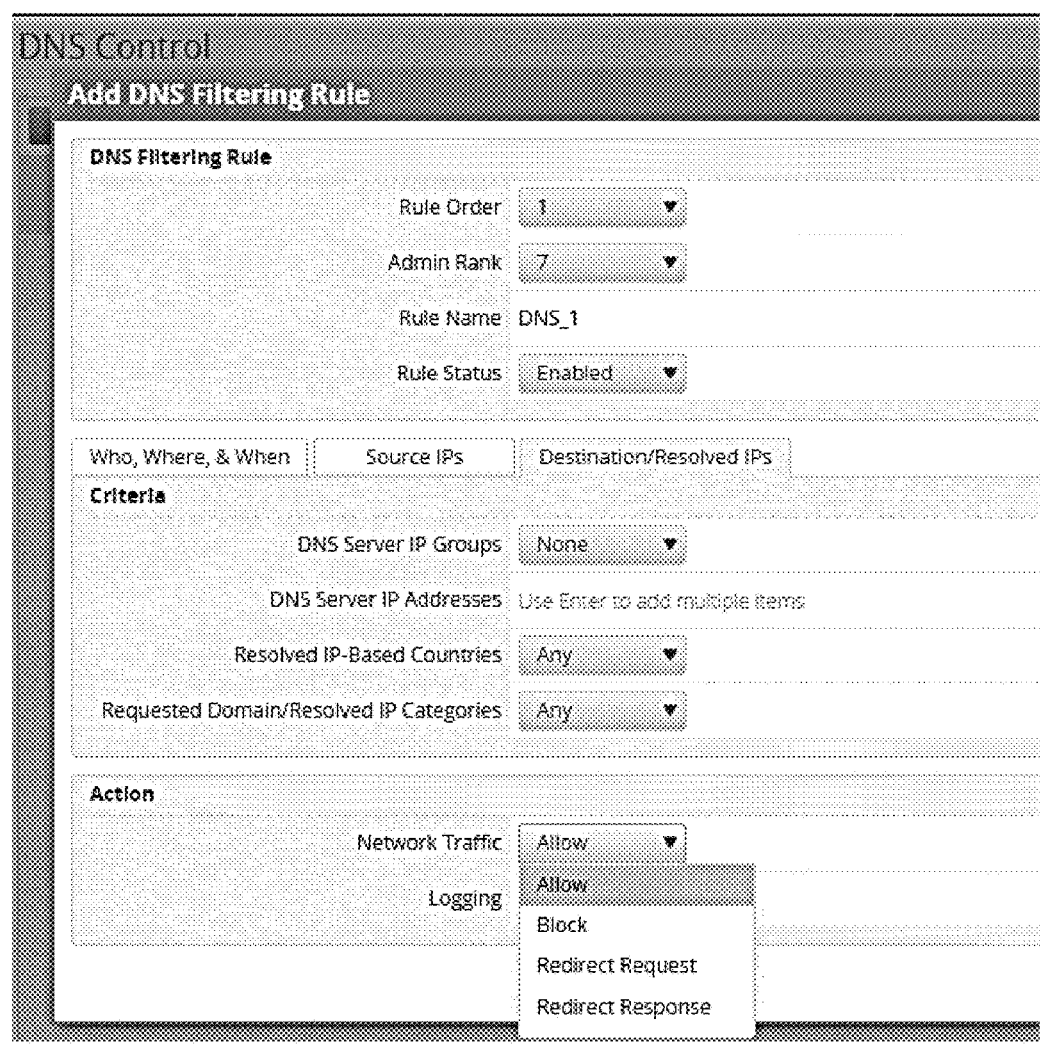

FIG. 21 is a screen shot of DNS policy. For example, use case can include guest wireless where a sub location is created for a guest wireless to apply DNS-based policies.

DNS policy includes an ability to apply policy based on DNS request—allow, block or redirect the request, redirect response. The DNS policy can be based on server IP or requested/resolved IP category.

§ 9.0 Reporting and Logging

The firewall 602 can support the log 604. In an exemplary embodiment, the log 604 can be through the logging nodes 140. The log 604 can be configurable. For example, by default, only blocked events or DNS events are logged. Aggregated logs can be used when logging exceeds certain thresholds or when large amounts of logs need to be processed and is of similar traffic type. For example, Internet Control Message Protocol (ICMP) logs will only be logged until a certain threshold, e.g., 10/second, and then no additional logs will be sent until the traffic falls back under the threshold. The definition of the thresholds for firewall sessions can be defined.

Each firewall rule can be configured for full or aggregated logging. Full logging can be enabled by default on block policies. Aggregate logging can be the default on for Allow rules. Allow rules can have the option to be changed to Full logging. In another exemplary embodiment, two types of log formats are enabled per rule—i) Full Session logging-performed for all block firewall policies+DNS transactions, and ii) Hourly (or Aggregate) logging-performed for Web logs to avoid duplication with Web transactions.

A log format for the log 604 for firewall logs can include:

---
Firewall instance ID
Session Duration
Time Stamp
User
Department
Location
Incoming Source IP
Incoming Destination IP
Incoming Source Port
Incoming Destination Port
Outgoing Source IP
Outgoing Destination IP
Outgoing Source Port
Outgoing Destination Port
Matched firewall rules
Firewall service
Firewall application
Action (Allow, block)
Client TX Bytes (from client to firewall 602) - Outbound
Client RX Bytes (from firewall 602 to client) - Inbound
GRE or VPN
IP Category
Cloud node 502 ID
---

A log format for the log 604 for DNS Request/Response logs can include:

---
Log Number
Time
User
Department
Location
Source IP
Destination IP
Query Domain
IPs
Category
---

A log format for the log 604 for Attack logs can include:

---
Port Scan
Syn Flood
Tear Drop
ICMP Flood
UDP Flood
WinNuke
Etc.
---

The purpose of the reports is primarily two-fold, namely i) to provide visibility into the top Applications and Services that are traversing the network and ii) to provide visibility into top firewall threats that have been detected. Note, because the firewall 602 is multi-tenant and distributed (e.g., worldwide), the visibility can be used to detect zero-day/zero-hour threats and instantly provide defense.

Several reports can be supported to display the various fields above in columns which can be configured to be visible or hidden in the display. The reports cab be available based on a number of sessions or bytes. The admin can have the ability to filter based on the various fields. The filter can allow admin (or other users) to show all sessions for a defined between for a particular user, IP address (Source or Destination), or group of IP addresses. There can be two types of reports: Real-time reports generated by Compressed Stats and Analyze reports generated by full session log analysis. Each report below is marked as (RT) Real-Time or (Analyze). Exemplary reports can include Firewall Usage Trend, Top firewall Applications (based # of sessions and bytes)—Includes Applications detected over HTTP, HTTPS (RT), Top Blocked Rules Hit (RT), Top Internal Source IPs (Analyze), Top Destination IPs (Analyze), Top Users (RT), Top Departments (RT), Top Locations (RT), List of Top Users/Departments/Locations with Top Protocols for each User/Dept/Location, List of Top IPs with Top protocols per IP, Top firewall Attacks (Analyze), etc.

Figure 22:
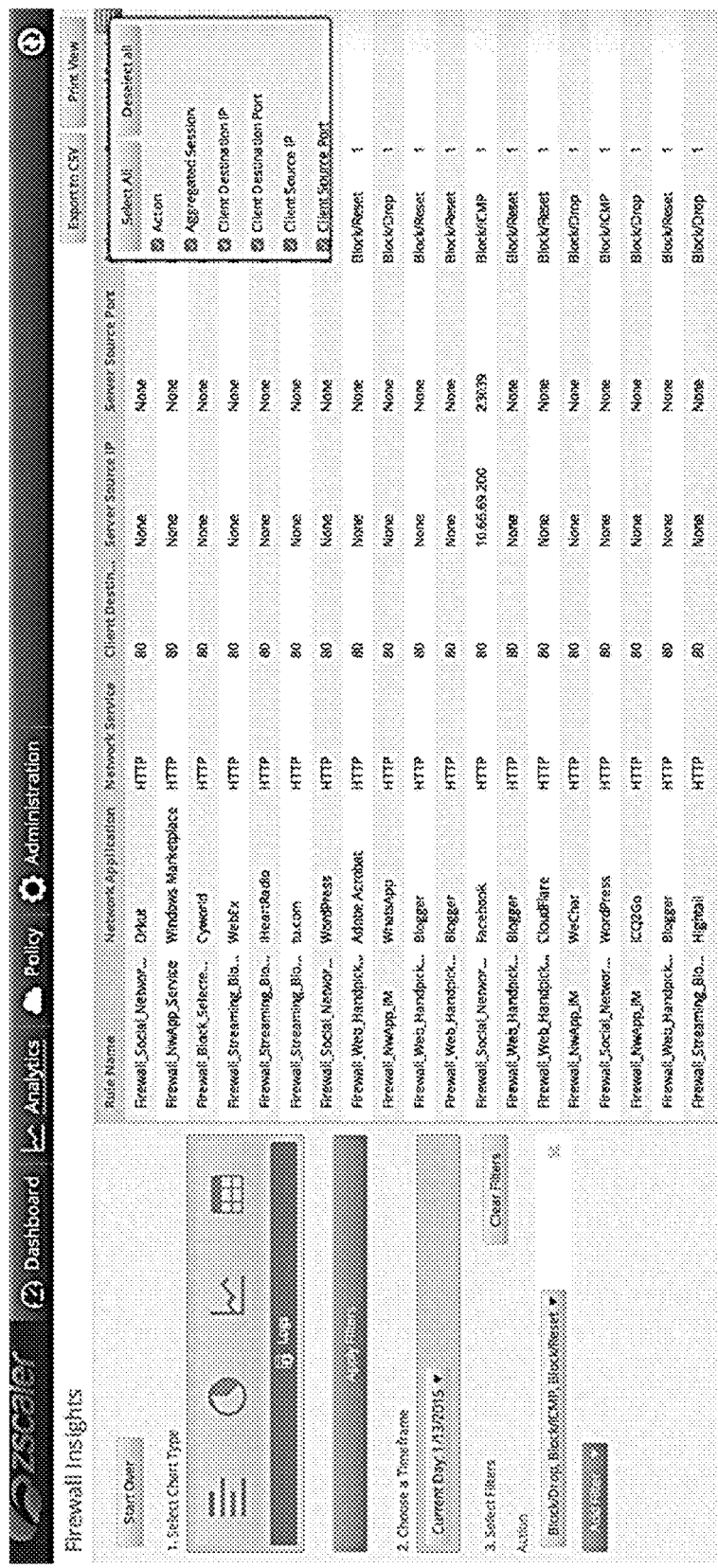
FIG. 22 is a screen shot of a reporting screen for firewall insights.
Figure 23:
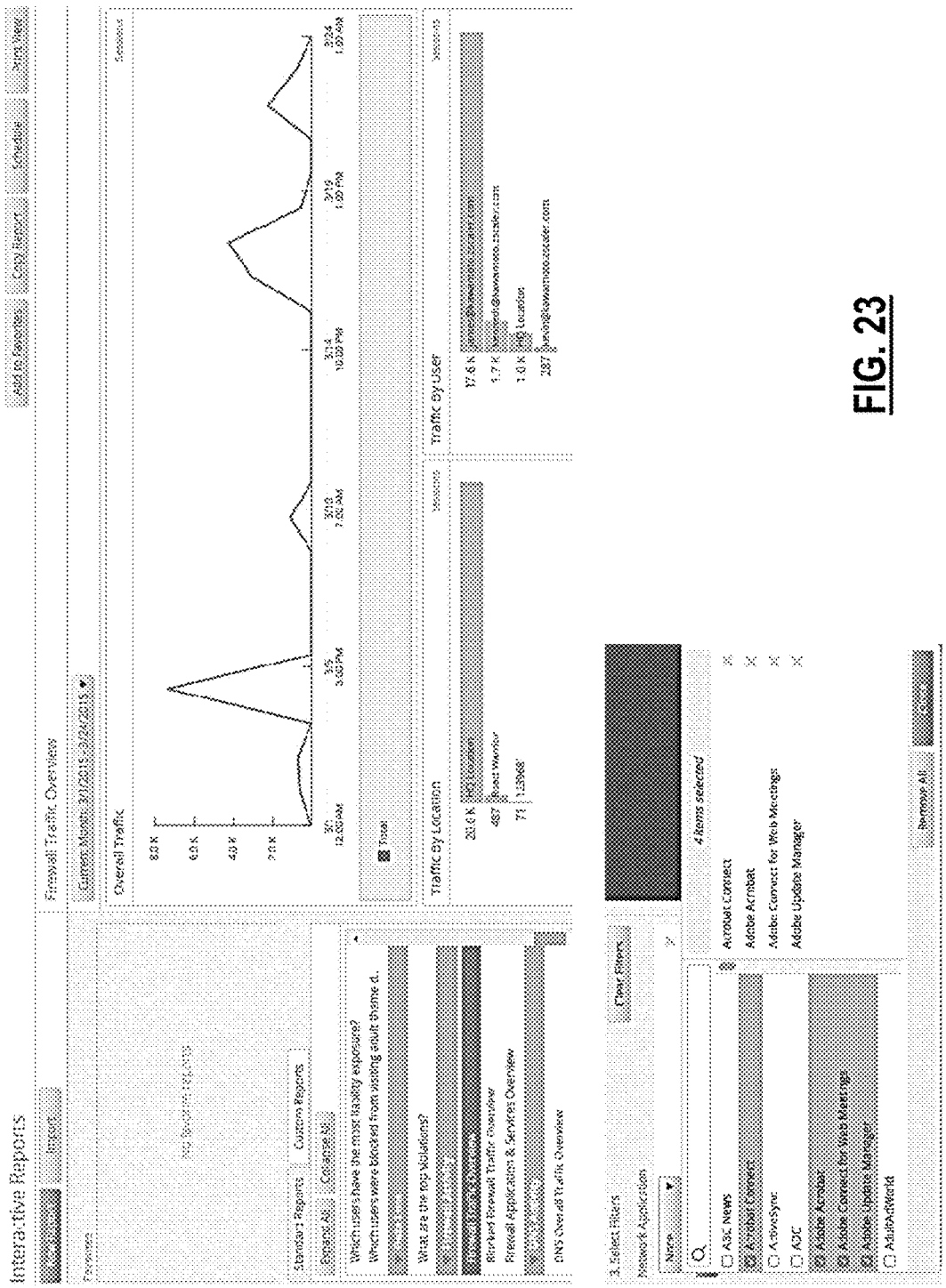
FIG. 23 is a screen shot of an interactive report for firewall insights.
Figure 24:
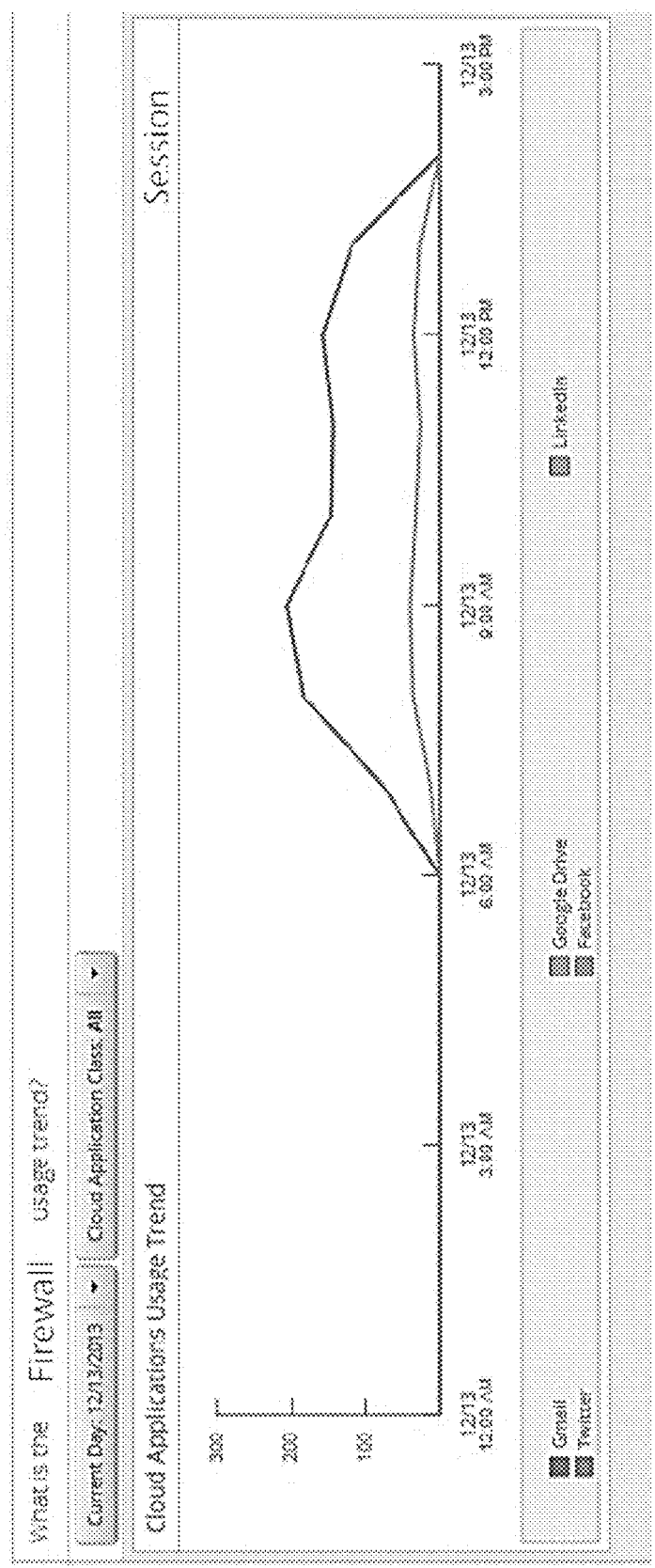
FIG. 24 is a screen shot of a graph of usage trends through the firewall.

FIG. 22 is a screen shot of a reporting screen for firewall insights. FIG. 23 is a screen shot of an interactive report for firewall insights. FIG. 24 is a screen shot of a graph of usage trends through the firewall 602. FIG. 25 is graphs of top firewall protocols in sessions and bytes.

In an exemplary embodiment, a multi-tenant cloud-based firewall session logging method performed by a cloud node includes firewall Session Stats logging where are a firewall module records aggregated statistics based on various criterion such as client IP, user, network application, location, rule ID, network service etc., firewall Session Full logging where the firewall module records complete criterion such as user location, network application, customer location, rule ID, network service, client IP, etc. based on every session, and the firewall module implements Rule based choice of logging as described herein.

In another exemplary embodiment, a multi-tenant cloud-based firewall with integrated web proxy method is performed by a node in the cloud. Firewall traffic which is determined to be web traffic (default port 80/443) is sent through the web proxy prior to being processed by the firewall engine or non-web traffic (default non-port 80/443) traffic. Non-web traffic is processed by the firewall engine bypassing the web proxy engine. Rule order precedence of web traffic processed through the web proxy policies before being processed by firewall policies. The firewall module integrated web proxy could reply End User Notification pages if user traffic hits policies with action block.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A multi-tenant cloud-based firewall method comprising:
    at a cloud node in a cloud system located on the Internet external from a client or an enterprise network associated with the client, wherein the cloud node operates a multi-tenant firewall in the cloud system which performs firewall functions for a plurality of customers each having one or more rules and at least two customers having different rules from one another, receiving a packet from the client with the client connected to the cloud node via a tunnel over the Internet;
    responsive to the packet being a first packet in a session, creating a firewall session on a slow path for the packet which identifies the client, location, and which customer the client is associated with, looks up the associated one or more rules for the customer and the location, and allocates resources for the firewall session in the cloud node;
    responsive to the packet not being the first packet, checking if the firewall session exists for the packet in the cloud node, and if so, processing the packet on a fast path where a lookup is performed to find the firewall session;
    processing the first packet and subsequent packets in the firewall session according to the associated one or more rules, wherein the firewall session is performed by the cloud node in the cloud system to allow or block the packet between the client and a destination on the Internet based on the associated one or more rules; and
    determining an application associated with the first packet and subsequent packets in the firewall session utilizing Deep Packet Inspection (DPI) which analyzes a plurality of packets including the first packet and the subsequent packets, wherein the application is determined subsequent to creation of the firewall session, and wherein the associated one or more rules in the firewall session are set initially based on the creating and then modified based on the determined application.

2. The method of claim 1, wherein the cloud node performs the method without a corresponding appliance or hardware on premises, at a location associated with the client, for providing a firewall.

3. The method of claim 1, wherein each customer has its own rules for any of users, locations, departments, and groups.

4. The method of claim 1, wherein the cloud node is part of a distributed security system and further comprising:
    processing the packet for a plurality of malware, spyware, viruses, email spam, Data Leakage Prevention, and content filtering.

5. The method of claim 1, wherein the client is connected to the cloud node via one of Generic Routing Encapsulation (GRE) and an Internet Protocol (IP) security (IPsec) tunnel, regardless of location and device type of the client.

6. The method of claim 1, wherein the DPI comprises one or more of explicit classification, use of protocol data signatures, classification based on port, classification based on Internet Protocol (IP), pattern matching, and session correlation.

7. The method of claim 1, wherein the one or more rules operate over all ports and protocols.

8. The method of claim 1, wherein the one or more rules comprise user-based filtering rules based on identifying the client based on surrogation.

9. A cloud node in a cloud-based security system, comprising:
    a network interface, a data store, and a processor communicatively coupled to one another, wherein the cloud node is located on the Internet external from a client or an enterprise associated with the client, wherein the cloud node operates a multi-tenant firewall in the cloud-based security system which performs firewall functions for a plurality of customers each having one or more rules and at least two customers having different rules from one another; and
    memory storing computer executable instructions, and in response to execution by the processor, the computer-executable instructions cause the processor to perform steps of
        receive a packet from a device connected to the cloud node via a tunnel over the Internet;
        responsive to the packet being a first packet in a session, create a firewall session on a slow path for the packet which identifies the client, location, and which customer the client is associated with, looks up the associated one or more rules for the customer and the location, and allocates resources for the firewall session in the cloud node;
        responsive to the packet not being the first packet, check if the firewall session exists for the packet in the cloud node, and if so, process the packet on a fast path where a lookup is performed to find the firewall session;

process the first packet and subsequent packets in the firewall session according to the associated one or more rules, wherein the firewall session is performed by the cloud node in the cloud-based security system to allow or block the packet between the client and a destination on the Internet based on the associated one or more rules; and determine an application associated with the first packet and subsequent packets in the firewall session utilizing Deep Packet Inspection (DPI) which analyzes a plurality of packets including the first packet and the subsequent packets, wherein the application is determined subsequent to creation of the firewall session, and wherein the associated one or more rules in the firewall session are set initially based on creation of the firewall session and then modified based on the determined application.

10. The node of claim 9, wherein the firewall session is paired between a client side and a server side where the client side establishes a session to reach the server via an original destination Internet Protocol (IP) address and port or via redirection based on configured Destination Network Address Translation (DNAT) policy, wherein the server side establishes a session using a 5-tuple based Network Address Translation with the destination IP and port based on the DNAT policy, the destination IP derived from a configured domain name, and source IP configured as an outbound IP of the multi-tenant cloud-based firewall and source port allocated based on the destination IP, the port and protocol.

11. A security cloud system, comprising:
a plurality of processing nodes connected to the Internet;
one or more authority nodes connected to the plurality of processing nodes via the Internet;
wherein a processing node of the plurality of processing nodes is connected to one or more clients via a tunnel, the processing node is located on the Internet external from the one or more clients and from an enterprise network,
wherein the processing node operates a multi-tenant firewall in the security cloud system which performs firewall functions for a plurality of customers each having one or more rules and at least two customers having different rules from one another,
wherein, responsive to the processing node receiving a packet which is a first packet in a session, the processing node creates a firewall session on a slow path for the packet which identifies the client, location, and which customer the client is associated with, looks up the associated one or more rules for the customer and the location, and allocates resources for the firewall session in the processing node, wherein, responsive to the packet not being the first packet, the processing node checks if the firewall session exists for the packet, and if so, processes the packet on a fast path where a lookup is performed to find the firewall session;
wherein the processing node processes the first packet and subsequent packets in the firewall session according to the associated one or more rules, wherein the firewall session is performed by the processing node in the security cloud system to allow or block the packet between the client and a destination on the Internet based on the associated one or more rules; and
wherein an application associated with the first packet and subsequent packets in the firewall session is determined utilizing Deep Packet Inspection (DPI) which analyzes a plurality of packets including the first packet and the subsequent packets, wherein the application is determined subsequent to creation of the firewall session, and wherein the associated one or more rules in the firewall session are set initially based on creation of the firewall session and then modified based on the determined application.

12. The security cloud system of claim 11, wherein the processing node operates without a corresponding appliance or hardware on premises, at a location associated with the client, for providing a firewall.

13. The security cloud system of claim 11, wherein each customer has its own rules for any of users, locations, departments, and groups.

14. The security cloud system of claim 11, wherein the processing node is part of a distributed security system and is further configured to process the packet for a plurality of malware, spyware, viruses, email spam, Data Leakage Prevention, and content filtering.

15. The method of claim 11, wherein the client is connected to the processing node via one of Generic Routing Encapsulation (GRE) and an Internet Protocol (IP) security (IPsec) tunnel, regardless of location and device type of the client.

16. The security cloud system of claim 11, wherein the DPI comprises one or more of explicit classification, use of protocol data signatures, classification based on port, classification based on Internet Protocol (IP), pattern matching, and session correlation.

17. The security cloud system of claim 11, wherein the one or more rules operate over all ports and protocols.

18. The security cloud system of claim 11, wherein the one or more rules comprise user-based filtering rules based on identifying the client based on surrogation.

* * * * *